United States Patent
Koblenz et al.

(10) Patent No.: US 6,353,829 B1
(45) Date of Patent: Mar. 5, 2002

(54) METHOD AND SYSTEM FOR MEMORY ALLOCATION IN A MULTIPROCESSING ENVIRONMENT

(75) Inventors: Brian D. Koblenz, Seattle; Allan Porterfield, Bellevue; Burton J. Smith, Seattle, all of WA (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 09/221,657

(22) Filed: Dec. 23, 1998

(51) Int. Cl.$^7$ .............................................. G06F 17/30
(52) U.S. Cl. ........................ 707/100; 712/203; 712/233
(58) Field of Search ......................... 707/100; 712/203, 712/233

(56) References Cited

U.S. PATENT DOCUMENTS

| | | |
|---|---|---|
| 4,819,234 A | 4/1989 | Huber .......................... 371/19 |
| 4,872,167 A | 10/1989 | Maezawa et al. |
| 5,168,554 A | 12/1992 | Luke ........................... 395/161 |
| 5,301,325 A | 4/1994 | Benson ........................ 395/700 |
| 5,333,280 A | 7/1994 | Ishikawa et al. ............ 395/375 |
| 5,450,575 A | 9/1995 | Sites ........................... 395/700 |
| 5,504,932 A | 4/1996 | Vassiliadis et al. |
| 5,533,192 A | 7/1996 | Hawley et al. ......... 395/183.04 |
| 5,557,761 A | 9/1996 | Chan |
| 5,564,051 A | 10/1996 | Halliwell et al. ........... 395/600 |

(List continued on next page.)

FOREIGN PATENT DOCUMENTS

| | | |
|---|---|---|
| EP | 0422945 | 4/1991 |
| EP | 0455966 | 11/1991 |
| EP | 0537098 | 4/1993 |
| EP | 0855648 | 7/1998 |
| EP | 0864979 | 9/1998 |
| GB | 2307760 | 6/1997 |

OTHER PUBLICATIONS

Smith, Burton, "The End of Architecture," Keynote Address Presented at the 17$^{th}$ Annual Symposium on Computer Architecture, Seattle, Washington, May 29, 1990. p 1–5.
Richard Korry et al., "Memory Management in the Tera MTA System," 1995. p 1–11.
Smith, Burton, "Opportunities for Growth in High Performance Computing," Nov., 1994. p 1–3.
Gail Alverson et al., "Processor Management in the Tera MTA System," 1995. p 1–14.
Major System Characteristics of the TERA MTA, 1995. p 1–7.*
Touzeau, Roy F., "A Fortran Compiler for the FPS–164 Scientific Computer," Proceedings of the ACM SIGPLAN '84 Symposium on Compiler Construction, SIGPLAN Notices 19(6):48–57, Jun. 1984.*

(List continued on next page.)

Primary Examiner—Paul R. Lintz
(74) Attorney, Agent, or Firm—Perkins Coie LLP

(57) ABSTRACT

A method and system for allocating memory. The computer system on which the memory allocation system executes may support the simultaneous execution of multiple threads. Under control of a thread, the memory allocation system first identifies a bin associated with blocks ("lockers") of memory large enough to satisfy a memory allocation request. When the identified bin has a free locker, the memory allocation system searches a circular list of headers associated with the identified bin for a collection of lockers ("warehouse") that contains a locker that is available to be allocated. The memory allocation system allocates the found available locker to satisfy the request. If, however, the allocated bin has no free lockers, the memory allocation system allocates a warehouse with lockers large enough to satisfy the memory allocation request. The memory allocation system then adds a warehouse header for the allocated warehouse to a circular list of warehouse headers associated with the identified bin. The memory allocation system allocates a locker from the newly allocated warehouse to satisfy the memory allocation request.

68 Claims, 18 Drawing Sheets

U.S. PATENT DOCUMENTS

| | | | |
|---|---|---|---|
| 5,581,764 A | 12/1996 | Fitzgerald et al. | 395/703 |
| 5,594,864 A | 1/1997 | Trauben | |
| 5,598,560 A | 1/1997 | Benson | 395/707 |
| 5,632,032 A | 5/1997 | Ault et al. | 395/670 |
| 5,652,889 A | 7/1997 | Sites | 395/708 |
| 5,712,996 A | 1/1998 | Schepers | |
| 5,754,855 A | 5/1998 | Miller et al. | 395/676 |
| 5,768,592 A | 6/1998 | Chang | 395/704 |
| 5,768,891 A | 6/1998 | Robinson | 395/704 |
| 5,774,721 A | 6/1998 | Robinson | 395/683 |
| 5,787,245 A | 7/1998 | You et al. | 395/183.14 |
| 5,805,892 A | 9/1998 | Nakajima | 395/704 |
| 5,812,811 A | 9/1998 | Dubey et al. | 395/392 |
| 5,826,265 A | 10/1998 | Van Huben et al. | 707/8 |
| 5,867,643 A | 2/1999 | Sutton | 395/184.01 |
| 5,877,766 A | 3/1999 | Bates et al. | 345/357 |
| 5,887,166 A | 3/1999 | Mallick et al. | 395/672 |
| 5,901,315 A | 5/1999 | Edwards et al. | 395/704 |
| 5,903,730 A | 5/1999 | Asai et al. | 395/200.54 |
| 5,913,925 A | 6/1999 | Kahle et al. | 712/206 |
| 5,953,530 A | 9/1999 | Rishi et al. | 395/704 |
| 5,961,639 A | 10/1999 | Mallick et al. | 712/242 |
| 5,966,539 A | 10/1999 | Srivastava | 395/709 |
| 5,978,902 A | 11/1999 | Mann | 712/227 |
| 6,002,872 A | 12/1999 | Alexander, III et al. | 395/704 |
| 6,002,879 A | 12/1999 | Radigan et al. | 395/789 |
| 6,009,269 A | 12/1999 | Burrows et al. | 395/704 |
| 6,029,005 A | 2/2000 | Radigan | 395/709 |
| 6,049,671 A | 4/2000 | Slivka et al. | 395/212 |
| 6,058,493 A | 5/2000 | Talley | 714/38 |
| 6,059,840 A | 5/2000 | Click, Jr. | 717/9 |
| 6,072,952 A | 6/2000 | Janakiraman | 395/704 |
| 6,094,716 A | 7/2000 | Witt | 712/23 |
| 6,101,524 A | 8/2000 | Choi et al. | 709/102 |
| 6,112,293 A | 8/2000 | Witt | 712/216 |
| 6,151,701 A | 11/2000 | Humphreys et al. | 717/4 |

OTHER PUBLICATIONS

Linton, Mark A., "The Evolution of Dbx,"USENIX Summer Conference, Jun. 11–15, 1990. p 211–220.*

David Callahan and Burton Smith, A Future–Based Parallel Language for a General–Purpose Highly–Parallel Computer, Languages and Compilers for Parallel Computing, MIT Press, 1990. p 1–31.*

David Callahan et al., "Improving Register Allocation for Subscripted Variables," Proceedings of the ACM SIGPLAN Conference on Programming Language Design and Implementation, White Plains, New York, Jun. 20–22, 1990. p 53–65.*

Adelberg, Brad et al., "The Strip Rule System for Efficiently Maintaining Derived Data," Sigmod Record, Association for Computing Machinery, New York, vol. 26, No. 2, Jun. 1, 1997. p 147–158.*

Surajit, Chaudhuri and Umeshwar Dayal, "An Overview of Data Warehousing and OLAP Technology," Sigmod Record, Association for Computing, New York, vol. 26, No. 1, Mar. 1997. p 65–74.*

Agrawal, Gagan and Joel Saltz, "Interprocedural Data Flow Based Optimizations for Compilation of Irregular Problems," Annual Workshop on Languages and Compilers for Parallel Computing, 1995. p 465–479.*

Callahan, David, "Recognizing and Parallelizing Bounded Recurrences," Aug. 1991. unnumbered.*

D.H. Bailey et al., "The NAS Parallel Benchmarks—Summary and Preliminary Results," Numerical Aerodynamic Simulation (NAS) Systems Division, NASA Ames Research Center, California, 1991. p 158–165.

Robert Alverson et al, "The Tera Computer System,"Proceedings of 1990 ACM International Conference on Supercomputing, Jun. 1990. p 1–6.

Gail Alverson et al., "Scheduling on the Tera MTA," Job Scheduling Strategies for Parallel Processing, 1995. p 1–20.

Smith, Burton, The Quest for General–Purpose Parallel Computing. p 1–18.

Briggs, Preston and Keith D. Cooper, "Effective Partial Redundancy Elimination," ACM SIGPLAN Notices, Association for Computing Machinery, New York, vol. 29, No. 6, Jun. 1, 1994. p 159–170.

Click, Cliff, "Global Code Motion, Global Value Numbering," ACM SIGPLAN Notices, Association for Computing Machinery, New York, vol. 30, No. 6, Jun. 1, 1995. p 246–257.

Sreedhar, Vugranam C. and Guang R. Gao, "Incremental Computation of Dominator Trees," ACM SIGPLAN Notices, Association for Computing Machinery, New York, vol. 30, No. 3, Mar. 1, 1995. p 1–12.

Galarowicz, Jim et al., "Analyzing Message Passing Programs on the Cray T3E with PAT and VAMPIR," Research Report, "Online!", May 1998. p 1–21.

Anderson, Jennifer, et al., "Continuous Profiling: Where Have All The Cycles Gone?," Operating Systems Review, ACM Headquarters, New York, vol. 31, No. 5, Dec. 1, 1997.

Anderson, Gail et al., "Tera Hardward–Software Cooperation," Proceedings of Supercomputing 1997, San Jose, California, Nov. 1997. 20 pages.

Jack W. Davidson and David B. Whally, "Reducing the Cost of Branches by Using Registers," Proceedings of the 17th Annual Symposium on Computer Architecture, Seattle, Washington, May 28–31, 1990. p 182–191.

Jens Knoop et al., "The Power of Assignment Motion," ACM SIGPLAN '95 Conference on Programming Language Design and Implementation, La Jolla, California, Jun. 18–21, 1995. p 233–245.

Hiralal Agrawal, "Dominators, Super Blocks and Program Coverage," 21st ACM SIGPLAN–SIGACT Symposium on Principles of Programming Languages, Portland, Oregon, Jan. 17–21, 1994. p 25–34.

Tomas Lang and Miquel Huguet, "Reduced Register Saving/Restoring in Single–Window Register Files," Computer Architecture News, vol. 14, No. 3, Jun. 1986. p 17–26.

Kenneth J. Goldman, "Introduction to Data Structures," 1996 (retrieved from Internet, http://www.cs.wustl.edu{kjg/CS101_SP97/Notes?DataStructures/structures.html p 1–17.

Ashwin Ram and Janak H. Patel, "Parallel Garbage Collection Without Synchronization Overhead," 12th Annual Symposium on Computer Architecture, Jun. 17, 1985. p 84–90.

H. Hayashi et al., "ALPHA: A High Performance Lisp machine Equipped with a New Stack Structure and Garbage Collection System," 10th Annual International Symposium on Computer Architecture, 1983. p 342–348.

Tera MTA, Principles of Operation, Nov. 18, 1997. p 1–245.

Ji Minwen et al, Performance Measurements for Multi-threaded Programs, SIGMETRICS '98, ACM, 1998, pp. 161–170.

Jonathan E. Cook and Alexander L. Wolf, "Event Based Detection of Concurrency," SIGSOFT '98 ACM, 1998, pp. 34–45.

Jenn–Yuan Tsai et al., "Performance Study of a Concurrent Multithreaded Processor," IEEE, 1998, pp. 24–35.

"Method of Tracing Events in Multi–Threaded OS/1 Applications," IBM Tech. Disclosure Bulletin, Sep. 1993, pp. 19–22.

Priyadarshan Kolte and Mary Jean Harrold, "Load/Store Range Analysis for Global Register Allocation," ACM–SIGPLAN, Jun. 1993. p 268–277.

George Lal and Andrew W. Appel, "Iterated Register Coalescing," ACM Transactions on Programming Languages and Systems, vol. 18, No. 3, May 1996, pp. 300–324.

Fred C. Chow and John L. Hennessy, "The Priority–Based Coloring Approach to Register Allocation," ACM Transactions on Programming Languages and Systems, vol. 12, No. 4, Oct. 4, 1990, pp. 501–536.

Preston Briggs et al., "Coloring Heuristics for Register Allocation," Department of Computer Science, Rice University, Houston, Texas, Jun. 1989. p 279–284.

Preston Briggs et al., "Coloring Register Pairs," ACM Letters on Programming Languages and Systems, vol. 1, No. 1, Mar. 1992, pp. 3–13.

SangMin Shim and Soo–Mook Moon, "Split–Path Enhanced Pipeline Scheduling for Loops with Control Flows," IEEE, Dec. 2, 1998. p 93–102.

David Callahan and Brian Koblenz, "Register Allocation via Hierarchical Graph Coloring," Proceedings of the ACM SIGPLAN '91 Conference on Programming Language Design and Implementation, Toronto, Canada, Jun. 26–28, 1991. p 192–203.

* cited by examiner

METHOD AND SYSTEM FOR MEMORY ALLOCATION IN A MULTIPROCESSING ENVIRONMENT

TECHNICAL FIELD

The present invention relates generally to the field of memory allocation and, in particular, to the field of memory allocation in a multiprocessing environment.

BACKGROUND OF THE INVENTION

Parallel computer architectures generally provide multiple processors that can each be executing different tasks simultaneously. One such parallel computer architecture is referred to as a multithreaded architecture (MTA). The MTA supports not only multiple processors but also multiple streams executing simultaneously in each processor. The processors of an MTA computer are interconnected via an interconnection network. Each processor can communicate with every other processor through the interconnection network. FIG. 1 provides a high-level overview of an MTA computer. Each processor 101 is connected to the interconnection network and memory 102. Each processor contains a complete set of registers 101a for each stream. In addition, each processor also supports multiple protection domains 101b so that multiple user programs can be executing simultaneously within that processor.

Each MTA processor can execute multiple threads of execution simultaneously. Each thread of execution executes on one of the 128 streams supported by an MTA processor. Every clock time period, the processor selects a stream that is ready to execute and allows it to issue its next instruction. Instruction interpretation is pipelined by the processor, the network, and the memory. Thus, a new instruction from a different stream may be issued in each time period without interfering with other instructions that are in the pipeline. When an instruction finishes, the stream to which it belongs becomes ready to execute the next instruction. Each instruction may contain up to three operations (i.e., a memory reference operation, an arithmetic operation, and a control operation) that are executed simultaneously.

The state of a stream includes one 64-bit Stream Status Word ("SSW"), 32 64-bit General Registers ("R0–R31"), and eight 32-bit Target Registers ("T0–T7"). Each MTA processor has 128 sets of SSWs, of general registers, and of target registers. Thus, the state of each stream is immediately accessible by the processor without the need to reload registers when an instruction of a stream is to be executed.

The MTA uses program addresses that are 32 bits long. The lower half of an SSW contains the program counter ("PC") for the stream. The upper half of the SSW contains various mode flags (e.g., floating point rounding, lookahead disable), a trap disable mask (e.g., data alignment and floating point overflow), and the four most recently generated condition codes. The 32 general registers are available for general-purpose computations. Register R0 is special, however, in that it always contains a 0. The loading of register R0 has no effect on its contents. The instruction set of the MTA processor uses the eight target registers as branch targets. However, most control transfer operations only use the low 32 bits to determine a new program counter. One target register (T0) points to the trap handler, which may be an unprivileged program. When a trap occurs, the trapping stream starts executing instructions at the program location indicated by register T0. Trap handling is lightweight and independent of the operating system and other streams. A user program can install trap handlers for each thread to achieve specific trap capabilities and priorities without loss of efficiency.

Each MTA processor supports as many as 16 active protection domains that define the program memory, data memory, and number of streams allocated to the computations using that processor. Each executing stream is assigned to a protection domain, but which domain (or which processor, for that matter) need not be known by the user program.

The MTA divides memory into program memory, which contains the instructions that form the program, and data memory, which contains the data of the program. The MTA uses a program mapping system and a data mapping system to map addresses used by the program to physical addresses in memory. The mapping systems use a program page map and a data segment map. The entries of the data segment map and program page map specify the location of the segment in physical memory along with the level of privilege needed to access the segment.

The number of streams available to a program is regulated by three quantities slim, scur, and sres associated with each protection domain. The current numbers of streams executing in the protection domain is indicated by scur: it is incremented when a stream is created and decremented when a stream quits. A create can only succeed when the incremented scur does not exceed sres, the number of streams reserved in the protection domain. The operations for creating, quitting, and reserving streams are unprivileged. Several streams can be reserved simultaneously. The stream limit slim is an operating system limit on the number of streams the protection domain can reserve.

When a stream executes a CREATE operation to create a new stream, the operation increments scur, initializes the SSW for the new stream based on the SSW of the creating stream and an offset in the CREATE operation, loads register (T0), and loads three registers of the new stream from general purpose registers of the creating stream. The MTA processor can then start executing the newly created stream. A QUIT operation terminates the stream that executes it and decrements both sres and scur. A QUIT_PRESERVE operation only decrements scur, which gives up a stream without surrendering its reservation.

The MTA supports four levels of privilege: user, supervisor, kernel, and IPL,. The IPL level is the highest privilege level. All levels use the program page and data segment maps for address translation, and represent increasing levels of privilege. The data segment map entries define the minimum levels needed to read and write each segment, and the program page map entries define the exact level needed to execute from each page. Each stream in a protection domain may be executing at a different privileged level.

Two operations are provided to allow an executing stream to change its privilege level. A "LEVEL_ENTER lev" operation sets the current privilege level to the program page map level if the current level is equal to lev. The LEVEL_ENTER operation is located at every entry point that can accept a call from a different privilege level. A trap occurs if the current level is not equal to lev. The "LEVEL_RETURN lev" operation is used to return to the original privilege level. A trap occurs if lev is greater than the current privilege level.

An exception is an unexpected condition raised by an event that occurs in a user program, the operating system, or the hardware. These unexpected conditions include various floating point conditions (e.g., divide by zero), the execution of a privileged operation by a non-privileged stream, and the failure of a stream create operation. Each stream has an exception register. When an exception is detected, then a bit in the exception register corresponding to that exception is set. If a trap for that exception is enabled, then control is transferred to the trap handler whose address is stored in register T0. If the trap is currently disabled, then control is transferred to the trap handler when the trap is eventually enabled assuming that the bit is still set in the exception register. The operating system can execute an operation to raise a domain_signal exception in all streams of a protection domain. If the trap for the domain_signal is enabled, then each stream will transfer control to its trap handler.

Each memory location in an MTA computer has four access state bits in addition to a 64-bit value. These access state bits allow the hardware to implement several useful modifications to the usual semantics of memory reference. These access state bits are two data trap bits, one full/empty bit, and one forward bit. The two data trap bits allow for application-specific lightweight traps, the forward bit implements invisible indirect addressing, and the full/empty bit is used for lightweight synchronization. The behavior of these access state bits can be overridden by a corresponding set of bits in the pointer value used to access the memory. The two data trap bits in the access state are independent of each other and are available for use, for example, by a language implementer. If a trap bit is set in a memory location, then an exception will be raised whenever that location is accessed if the trap bit is not disabled in the pointer. If the corresponding trap bit in the pointer is not disabled, then a trap will occur.

The forward bit implements a kind of "invisible indirection." Unlike normal indirection, forwarding is controlled by both the pointer and the location pointed to. If the forward bit is set in the memory location and forwarding is not disabled in the pointer, the value found in the location is interpreted as a pointer to the target of the memory reference rather than the target itself. Dereferencing continues until either the pointer found in the memory location disables forwarding or the addressed location has its forward bit cleared.

The full/empty bit supports synchronization behavior of memory references. The synchronization behavior can be controlled by the full/empty control bits of a pointer or of a load or store operation. The four values for the full/empty control bits are shown below.

| VALUE | MODE | LOAD | STORE |
| --- | --- | --- | --- |
| 0 | normal | read regardless | write regardless and set full |
| 1 | | reserved | reserved |
| 2 | future | wait for full and leave full | wait for full and leave full |
| 3 | sync | wait for full and set empty | wait for empty and set full |

When the access control mode (i.e., synchronization mode) is future, loads and stores wait for the full/empty bit of memory location to be accessed to be set to full before the memory location can be accessed. When the access control mode is sync, load are treated as "consume" operations and stores are treated as "produce" operations. A load waits for the full/empty bit to be set to full and then sets the full/empty bit to empty as it reads, and a store waits for the full/empty bit to be set to empty and then sets the full/empty bit to full as it writes. A forwarded location (i.e., its forward bit is set) that is not disabled (i.e., by the access control of a pointer) and that is empty (i.e., full/empty bit is set to empty) is treated as "unavailable" until its full/empty bit is set to full, irrespective of access control.

The full/empty bit may be used to implement arbitrary indivisible memory operations. The MTA also provides a single operation that supports extremely brief mutual exclusion during "integer add to memory." The FETCH_ADD operation loads the value from a memory location and stores the sum of that value and another value back into the memory location.

Each protection domain has a retry limit that specifies how many times a memory access can fail in testing full/empty bit before a data blocked exception is raised. If the trap for the data blocked exception is enabled, then a trap occurs. The trap handler can determine whether to continue to retry the memory access or to perform some other action. If the trap is not enabled, then the next instruction after the instruction that caused the data blocked exception is executed.

FIG. 2A illustrates the layout of the 64-bit exception register. The upper 32-bits contain the exception flags, and the lower 32 bits contain poison bits. There is one poison bit for each general register. When a poison bit is set, an exception is raised when the contents of that general register is accessed. The poison bits are used primarily for speculative loads. Bits 40–44 contain the flags for the user exceptions, which include a create stream exception, a privileged instruction exception, a data alignment exception, and a data blocked exception. A data blocked exception is raised when a data memory retry exception, a trap 0 exception, a trap 1 exception, or a long memory latency timeout is generated. The program handling a data blocked exception is responsible for determining the cause of the data blocked exception. The exception register contains one poison bit for each of the 32 general registers. If the poison bit is set, then an attempt to access the content of the corresponding register will raise an exception.

FIG. 2B illustrates the layout of the 64-bit stream status word. The lower 32 bits contain the program counter, bits 32–39 contain mode bits, bits 40–51 contain a trap mask, and bits 52–63 contain the condition codes of the last four instructions executed. Bit 37 within the mode bits indicates whether speculative loads are enabled or disabled. Bit 48 within the trap mask indicates whether a trap on a user exception is enabled (bits 40–44 of the SSW). Thus, traps for the user exceptions are enabled or disabled as a group.

FIG. 2C illustrates the layout of a word of memory and in particular a pointer stored in a word of memory. Each word of memory contains a 64-bit value and a 4-bit access state. The 4-bit access state is described above. When the 64-bit value is used to point to a location in memory, it is referred to as a "pointer." The lower 48 bits of the pointer contains the address of the memory location to be accessed, and the upper 16 bits of the pointer contain access control bits. The access control bits indicate how to process the access state bits of the addressed memory location. One forward disable bit indicates whether forwarding is disabled, two full/empty control bits indicate the synchronization mode; and four trap 0 and 1 disable bits indicate whether traps are disabled for stores and loads, separately. If the forward disable bit is set, then no forwarding occurs regardless of the setting of the forward enable bit in the access state of the addressed memory location. If the trap 1 store disable bit is set. then a trap will not occur on a store operation, regardless of the setting of the trap 1 enable bit of the access state of the addressed memory location. The trap 1 load disable, trap 0 store disable, and trap 0 load disable bits operate in an analogous manner. Certain operations include a 5-bit access control operation field that supersedes the access control field of a pointer. The 5-bit access control field of an operation includes a forward disable bit, two full/empty control bits, a trap 1 disable bit, and a trap 0 disable bit. The bits effect the same behavior as described for the access control pointer field, except that each trap disable bit disables or enables traps on any access and does not distinguish load operations from store operations.

When a memory operation fails (e.g., synchronized access failure), an MTA processor saves the state of the operation. A trap handler can access that state. That memory operation can be redone by executing a redo operation (i.e., DATA_OP_REDO) passing the saved state as parameters of the operation. After the memory operation is redone (assuming it does not fail again), the trapping stream can continue its execution at the instruction after the trapping instruction.

The appendix contains the "Principles of Operation" of the MTA, which provides a more detailed description of the MTA.

Conventional computer systems provide memory allocation techniques that allow programs to allocate and de-allocate (i.e., free) memory dynamically. To allocate a block of memory, a program invokes a memory allocation routine (e.g., "malloc") passing the size of the requested block of memory. The memory allocation routine locates a free block of memory, which is usually stored in a "heap," marks the block as being allocated, and returns to the program a pointer to the allocated block of memory. The program can then use the pointer to store data in the block of memory. When the program no longer needs that block of memory, the program invokes a memory free routine (e.g., "free") passing a pointer to the block of memory. The memory free routine marks the block as free so that it can be allocated to a subsequent request.

A program executing on a single-threaded processor may have multiple threads that execute concurrently, but not simultaneously. Each of these threads may request that memory be allocated or freed. Conventional memory allocation techniques, however, do not support the concurrent execution of memory allocation or memory free routines. If such routines were executed concurrently, a thread may find the state of the data structures used when allocating and freeing memory to be inconsistent because another thread is in the process of updating the state. Conventional memory allocation techniques may use a conventional locking mechanism (e.g., a semaphore) to prevent the concurrent execution of the memory allocation and memory free routines. Thus, the locked out threads will wait until another thread completes its memory allocation. Such waiting may be acceptable in a single-threaded processor environment, because only one thread can be executing at anytime so the processor may be always kept busy. Such waiting, however, is unacceptable in a multithreaded processor environment because many streams of the processor may be left idle waiting for a thread executing on another stream to complete its memory allocation request.

Conventional memory allocation routines are typically optimized to allocated memory based on the expected allocation patterns of the programs. For example, if it is expected that the programs will allocate many small blocks of memory, the memory allocation routines are optimized to allocate small blocks of memory efficiently. If, however, a program requests that a large block of memory be allocated, it may be very inefficient to service the request because, for example, it may be necessary to coalesce many free small blocks of memory into a single block of memory large enough to satisfy the request. Conversely, a conventional memory allocation routine may be optimized to allocate large blocks of memory efficiently. In such a case, it may be very efficient to allocate large blocks of memory but inefficient either computationally or in memory usage to allocate many small blocks.

It would be desirable to have a memory allocation technique that would maximize the concurrent execution of memory allocation routines and optimize the allocation of both large and small blocks of memory.

SUMMARY OF THE INVENTION

Embodiments of the present invention provide a method and system for allocating memory. The computer system on which the memory allocation system executes supports the simultaneous execution of multiple threads. Under control of a thread, the memory allocation system first identifies a bin associated with blocks ("lockers") of memory large enough to satisfy a memory allocation request. When the identified bin has a free locker, the memory allocation system searches a circular list of headers associated with the identified bin for a collection of lockers ("warehouse") that contains a locker that is available to be allocated. The memory allocation system allocates the found available locker to satisfy the request. If, however, the allocated bin has no free lockers, the memory allocation system allocates a warehouse with lockers large enough to satisfy the memory allocation request. The memory allocation system then adds a warehouse header for the allocated warehouse to a circular list of warehouse headers associated with the identified bin. The memory allocation system allocates a locker from the allocated warehouse to satisfy the memory allocation request.

In another aspect of the present invention, a technique in a computer system is provided for removing an item from a circular list that is simultaneously accessible by multiple threads of execution. Each item in the circular list points to a next item in the circular list. I)during execution of one thread, the technique identifies an item to be removed from the circular list. The technique then sets the item before the identified item to point to the item after the identified item. The technique then ensures that the identified item points to an item of the circular list so that when another thread accesses the identified item after the identified item has been removed from the circular list, the identified item still points to an item on the circular list.

In another aspect of the present invention, a method in a computer system is provided for detecting unauthorized access of a first word of memory. The technique establishes forwarding for the first word of memory (e.g., by setting the forward bit) and sets the first word of memory to point to a second word of memory. The second word of memory is a valid memory location. The technique establishes forwarding for the second word of memory and sets the second word of memory to point to an invalid memory location. When the first word is accessed with forwarding enabled, the access is forwarded to the second word. The access to the second word is in turn forwarded to the invalid memory location and unauthorized access to the first word is indicated. When the first word is accessed with forwarding disabled, the pointer to the second word of memory is retrieved and can be used to further access memory in an authorized manner.

BRIEF DESCRIPTION OF TILE DRAWINGS

FIG. 1 provides a high-level overview of an MTA computer.

Figure 15:
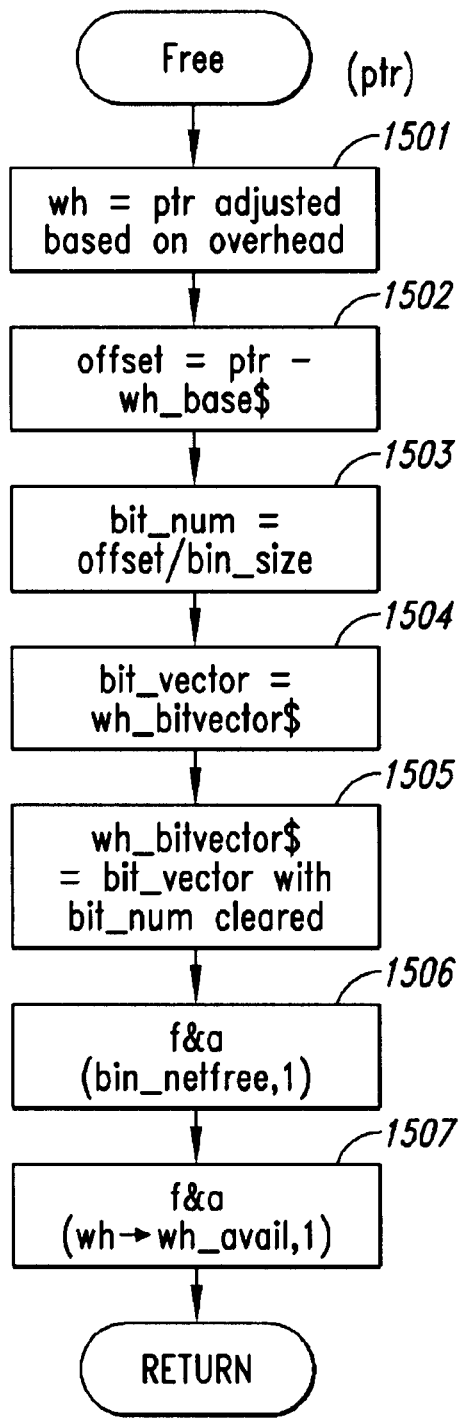

FIG. 15 an example implementation of a free memory routine.

Figure 16:
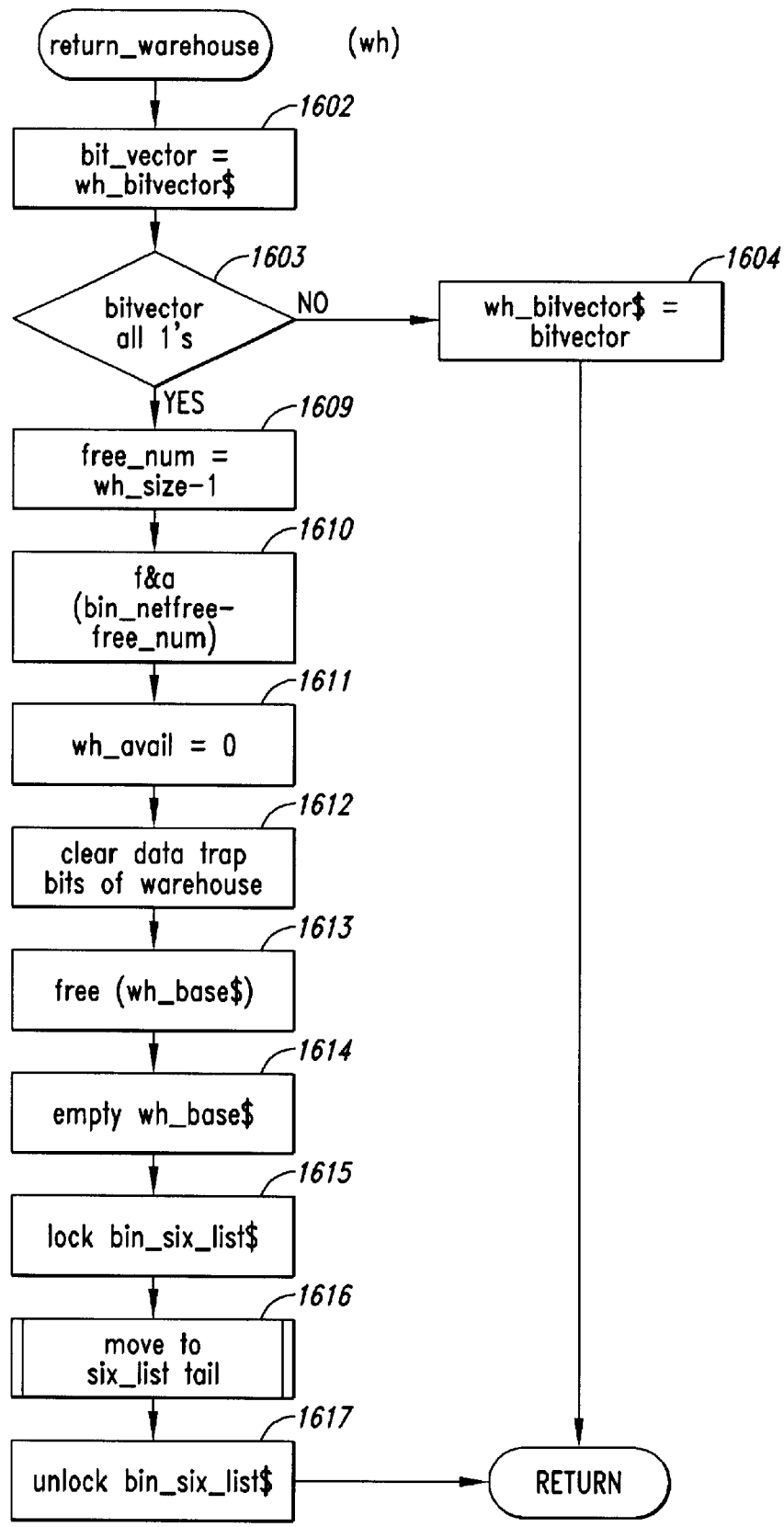

FIG. 16 is a flow diagram of an example implementation of a routine to free a warehouse whose lockers are all free.

Figure 17:
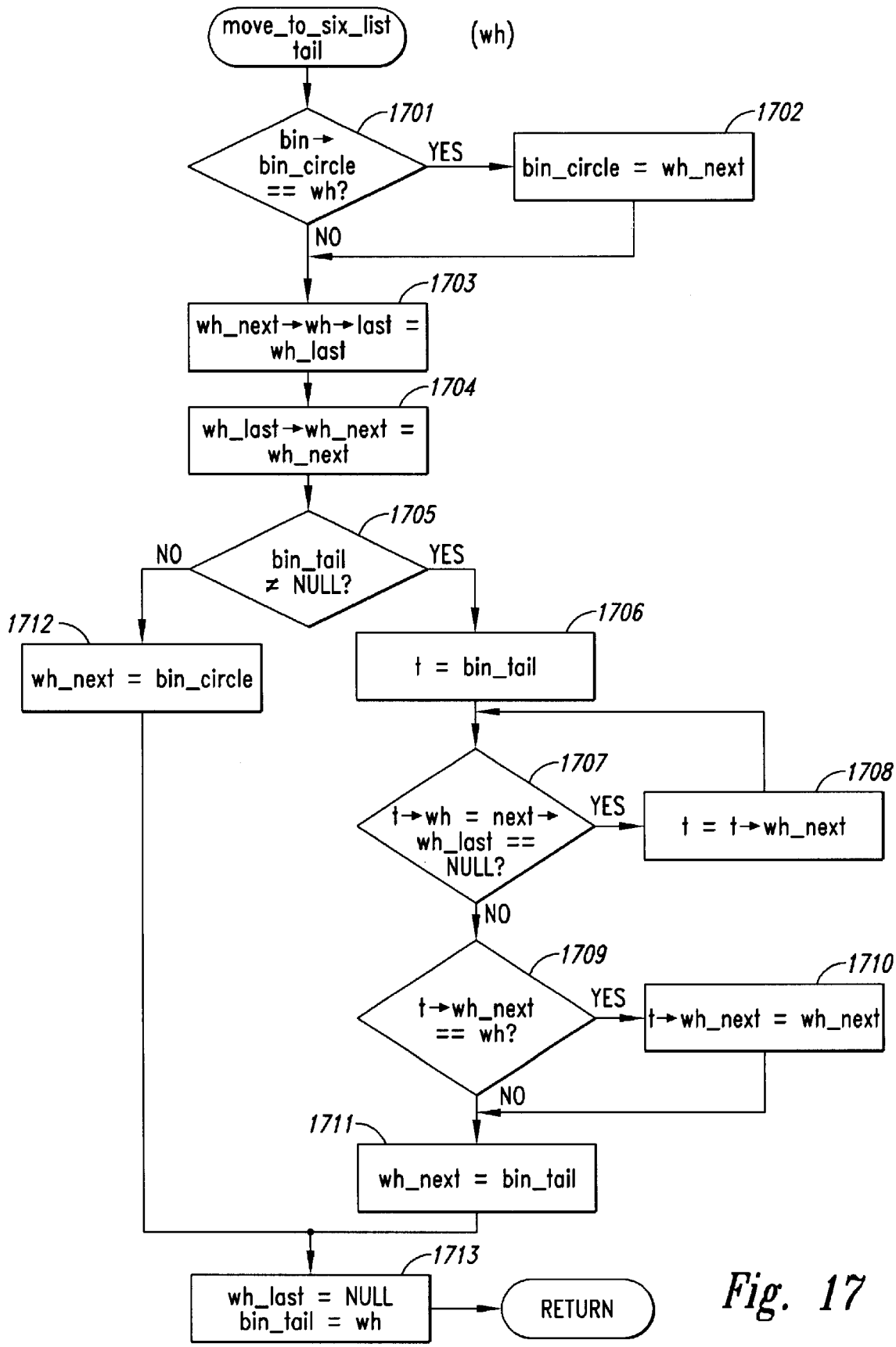

FIG. 17 is a flow diagram of an example implementation of a routine that moves a warehouse header to the tail portion of the six list.

DETAILED DESCRIPTION OF THE INVENTION

Embodiments of the present invention provide a method and system for allocating memory in a multithreaded environment. In one embodiment, the memory allocation system provides the large memory allocation component and the small memory allocation component. The threads of a process invoke the memory allocation system, which executes in the domain of the process, to dynamically allocate and free memory. A thread passes a request to allocate a block of memory of a certain size to the memory allocation system. In response to receiving the request, the memory allocation system determines whether the request is for a large or small block of memory and invokes the corresponding component. The small memory allocation component maintains a collection of blocks of memory of various predefined sizes. The small memory allocation component rounds up each allocation request to the next largest predefined size. In addition, the small memory allocation component is designed so that multiple threads can be simultaneously executing within the small memory allocation component. The large memory allocation component, in contrast, can be any conventional memory allocator. In one embodiment, only one thread is allowed to be executing within the large memory allocation component. In this way, a program that dynamically allocates mostly small blocks of memory can have its various threads simultaneously executing the memory allocation system when allocating these small blocks.

The small memory allocation component maintains several data structures to ensure computationally efficient and simultaneous allocation of small blocks of memory. The small memory allocation component groups ranges of block sizes into various "bins" of predefined sizes. The use of multiple bins helps improve the amount of concurrency achieved by the small memory allocation component. The small memory allocation component internally allocates the blocks of a predefined size in groups that may range up to 64 blocks. Such a group of blocks is referred to as a "warehouse." The blocks within a warehouse are referred to as "lockers." The small memory allocation component may have multiple warehouses allocated for particular bin, depending upon the allocation pattern of the program. For each bin, the small memory allocation component maintains a circular list data structure of warehouse headers that each point to a warehouse for that bin. The circular list data structure is referred to as a "six list" and has the property that multiple threads may be accessing the circular list data structure while a warehouse header is being added to or removed from the circular list. Conventional circular lists require that no threads be accessing a circular list when an item is being added or removed. Thus, the use of the six list helps improve the concurrency of the small memory allocation component.

When the small memory allocation component needs to internally allocate a warehouse to satisfy an allocation request, the small memory allocation component recursively invokes the memory allocation component requesting a block of memory the size of a warehouse for the bin. That recursive invocation may be routed to the small memory allocation component or the large memory allocation component. If routed to the small memory allocation component, another recursive invocation to the allocation memory system may be needed if the request cannot be satisfied. If the recursive invocation is eventually routed to the large memory allocation component and if the large memory allocation component cannot satisfy the request, the large memory allocation component invokes the services of the operating system to allocate a block of memory to the program.

During debugging of an application program, it may be necessary for a debugger, which executes as a thread of the program, to allocate memory. If the memory allocation system uses the same pool of available memory for both the debugger and the program, then problems may arise during debugging. For example, if the program sets a lock when allocating memory in one stream and a breakpoint is hit in another stream, the debugger may be impeded from allocating memory because of that lock. Also, when the debugger and the program share the same pool of available memory, the debugger influences the dynamic memory allocation pattern of the program, which may make the program more difficult to debug. To prevent such failure, one embodiment of the present invention uses one pool of available memory for the program and a separate pool of available memory for the debugger. With two separate pools, there is no chance that the memory allocation of the debugger will be affected by a lock placed by the program during memory allocation. A debugger for a multithreaded environment is described in co-pending U.S. patent application Ser. No. 09/191,985, entitled "Debugging Techniques in a Multithreaded Environment," filed on Nov. 13, 1998, which is hereby incorporated by reference. Also, separate pools of available memory may be used when a process is been swapped out by the operating system. The swapping out of a process by an operating system is described in co-pending U.S. patent application Ser. No. 09/192,205, entitled "User Program and Operating System Interface in a Multithreaded Environment," filed on Nov. 13, 1998, which is hereby incorporated by reference.

The small memory allocation component maps the size of the memory allocation request to the bin with the size that is next larger than the requested size. The small memory allocation component defines a fixed number of bins between each successive power of 2. For example, 16 bins may be defined between memory allocation size requests of $2^{10}$ and $2^{11}$. When mapping the requested size to the corresponding bin, the memory allocation system converts the requested size to a floating point representation and uses a combination of bits of the exponent and high-order bits of the mantissa represented in integer notation as the indication of the bin. Such a technique allows for be very efficient mapping of the requested size to the bin from which the request is to be satisfied.

Figure 1:
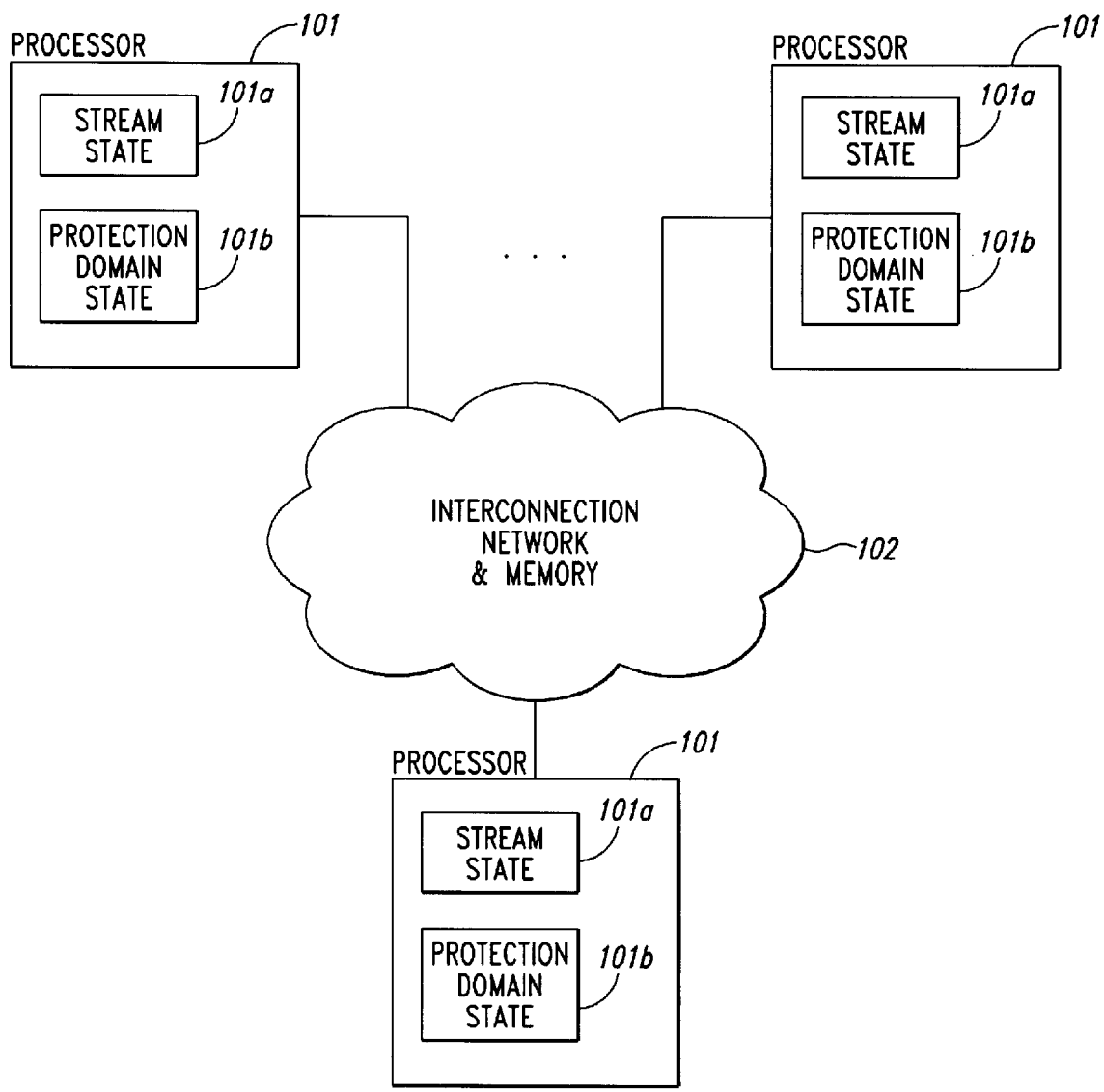
Figure 2A:
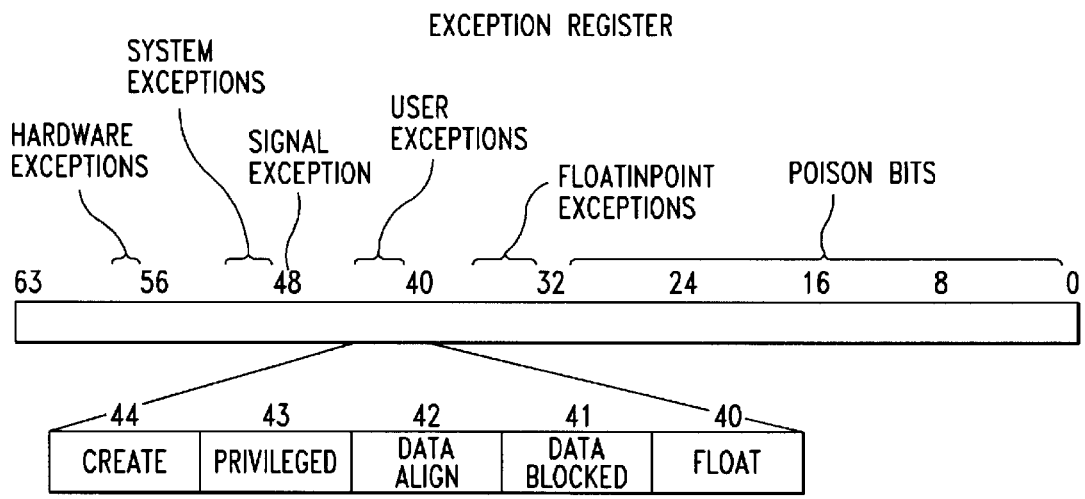
FIG. 2A illustrates the layout of the 64-bit exception register.
Figure 2B:
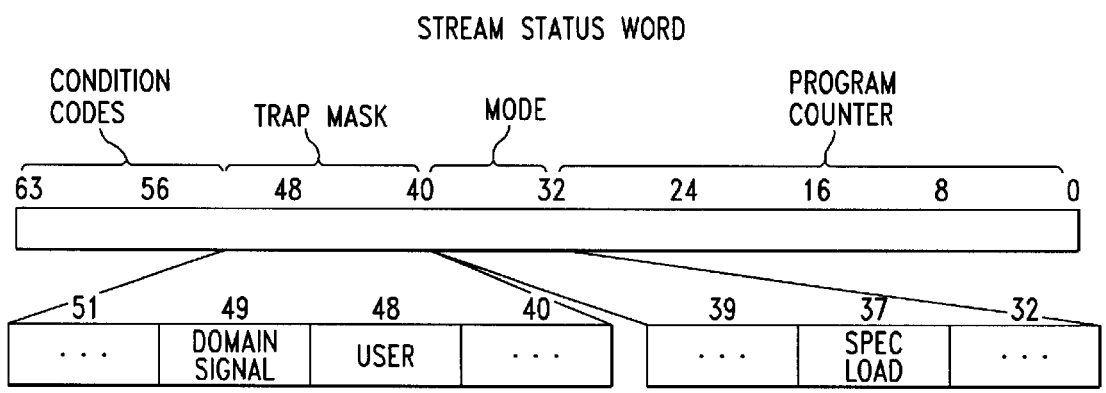
FIG. 2B illustrates the layout of the 64-bit stream status word.
Figure 2C:
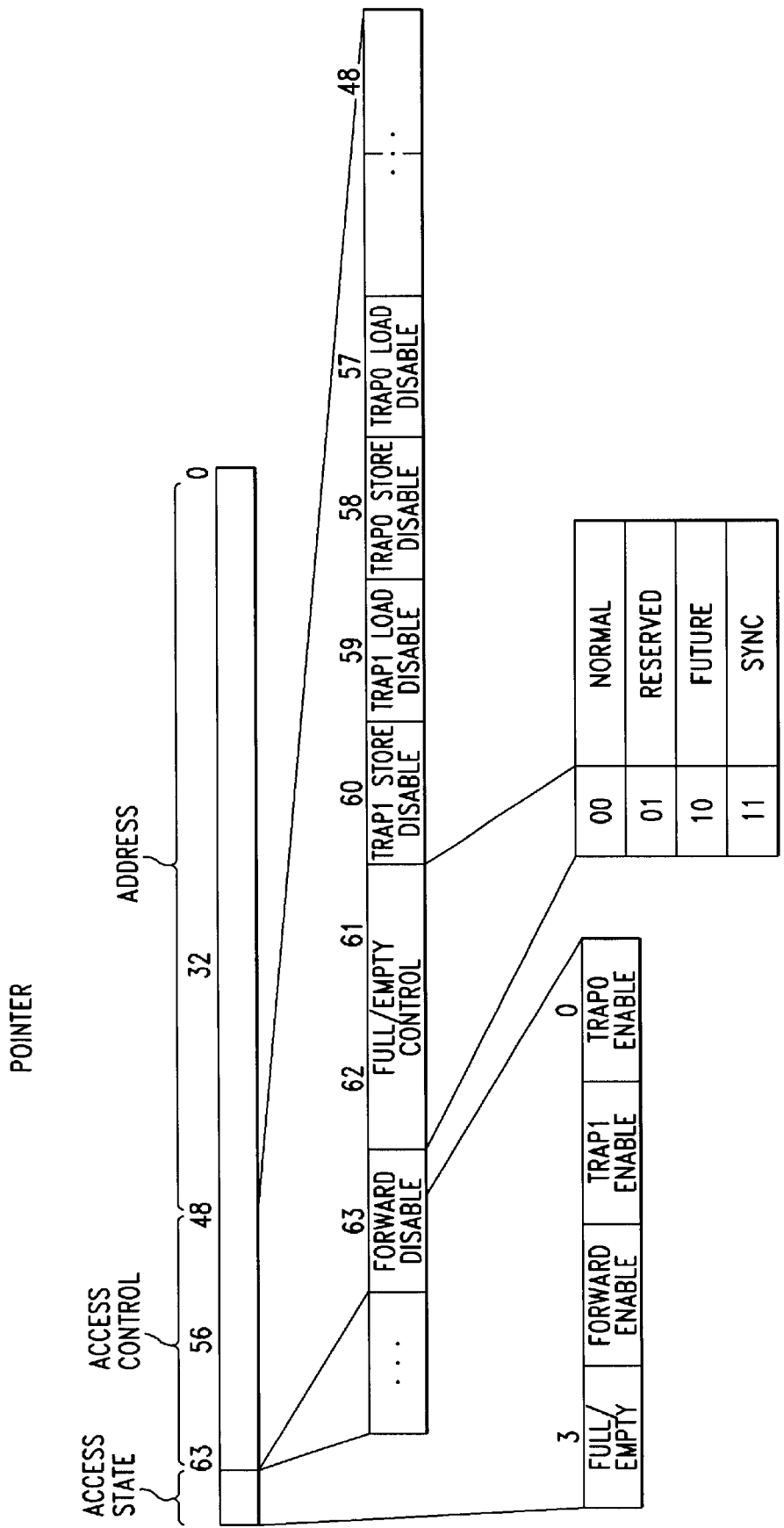
FIG. 2C illustrates the layout of a word of memory and in particular a pointer stored in a word of memory.
Figure 3:
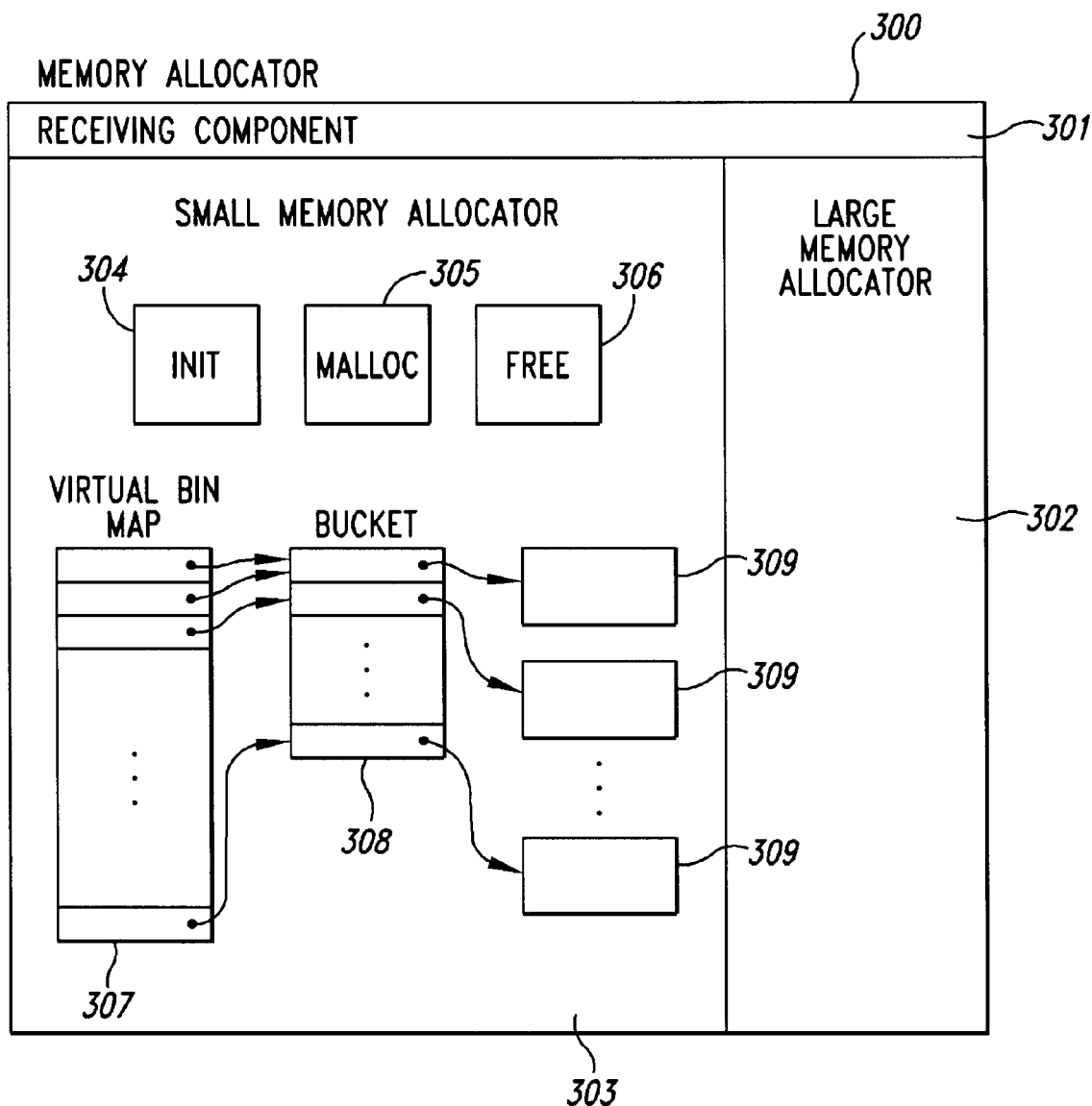
FIG. 3 is a block diagram of an embodiment of the memory allocator (i.e., allocation system) of the present invention.

FIG. 3 is a block diagram of an embodiment of the memory allocator (i.e., allocation system) of the present invention. The memory allocator 300 includes the receiving component 301, a large memory allocator 302, and a small memory allocator 303. The receiving component receives requests to allocate and free memory and determines whether the requests should be handled by the small memory allocator or the large memory allocator. In one embodiment, memory allocation requests larger than 1 MB are handled by the large memory allocator, but may be adjusted based on the memory allocation patterns of a particular user program or class of user programs. The large memory allocator can be any conventional memory allocator. The memory allocator prevents concurrent access to the large memory allocator by multiple threads by using a locking mechanism. Thus, only one thread can be executing the large memory allocator at a time. Alternatively, the large memory allocator may have a lock for each power of two of available memory sizes so that some concurrency is supported by the large memory allocator. The memory allocator, however, supports multiple threads concurrently executing the small memory allocator. The small memory allocator is designed under the assumption that the majority of memory allocation requests are requests to allocate a small amount of memory. In order to ensure that these requests can be satisfied in a computationally efficient manner and in away that reduces wasted memory, the small memory allocator defines bins that contain blocks of memory of predefined sizes. The small memory allocator rounds up the size of each request to a predefined size and allocates a block from that bin. Aq a result of rounding up the size of the request, a user program may be allocated more memory than actually requested. Although this wastes some amount of memory, the amount of memory wasted is small since the sizes of the blocks requested are small and the number of bins are many. Also, because the blocks are allocated in predefined sizes, the small memory allocator can allocate and free the blocks in a very computationally efficiently manner. Because it is assumed that the large memory allocator is invoked infrequently but with very large blocks, the large memory allocator minimizes the amount of memory wasted when allocating a block at the expense of computational efficiency. In particular, the large memory allocator in one embodiment, allocates blocks of memory of the exact size (or rounded to a small multiple of a byte such as a word) requested. Thus, the combination of a large memory allocator and a small memory allocator allows computationally efficient and concurrent execution of memory allocations for the majority of the allocation requests, while being reasonably space efficient.

The small memory allocator includes an initialize component 304, an allocate memory component 305, and a free memory component 306. The small memory allocator also includes a virtual bin map 307, a bucket array 308, and warehouse data structures 309. The initialize component initializes the various data structures, including the bucket array, that are used during small memory allocation. The allocate memory component receives a memory allocation request specifying a certain size of memory to be allocated, allocates a block of memory, and returns a pointer to the allocated block of memory. The free memory component receives a block of memory that is to be freed and frees the block of memory. The small memory allocator allocates blocks of memory of certain defined block sizes. When a memory allocation request is received, the small memory allocator rounds up the requested size to the next defined block size. The bucket array contains a bin for each defined block size. Each bin in the bucket array contains a pointer to a warehouse data structure that contains the blocks of memory for that defined block size. The small memory allocator uses the virtual bin map to map virtual bins to the actual bins of the bucket array. Each virtual bin has an associated virtual block size. A fixed number of bins, and thus virtual block sizes, are allocated between each pair of power of 2 of memory sizes that are less than the minimum large memory size. For example, a fixed number of bins are allocated between $2^{10}$ and $2^{11}$, and that same fixed number bins are allocated between $2^{11}$ and $2^{12}$. If the fixed number of bins to 16, then the virtual block sizes for the bins between $2^{10}$ and $2^{11}$ are $2^{10}+(1*2^6)$, $2^{10}+(2*2^6)$, . . . , $2^{10}+(15*2^6)$, and $2^{11}$, and the virtual block sizes for the bins between $2^{11}$ and $2^{12}$ are $2^{11}+(1*2^7)$, $2^{11}+(2*2^7)$, . . . , $2^{11}+(15*2^7)$, and $2^{12}$. The small memory allocator rounds requested block sizes between $2^{11}+1$ and $2^{11}+(1*2^7)$ up to $2^{11}+(1*2^7)$. Because the overhead of having a bin for each virtual block size may be unacceptable, in one embodiment, the small memory allocator maps multiple virtual bins to a single actual bin. The overhead may be unacceptable because a warehouse with multiple lockers may be allocated even though only one locker out of the warehouse is ever allocated. Thus, 63 times the actual bin size would be wasted. Thus, the small memory allocator, however, does not have an actual bin corresponding to each virtual bin especially for small virtual block sizes. Rather, the small memory allocator may group several virtual bins into an actual bin. That is, the sizes of memory allocation requests that fall within any of the virtual bins that mapped to an actual bin is rounded up to the largest size of any of those virtual bins. The virtual bin map as describe below in more detail contains this mapping. (In the following, all references to a memory allocator refer to the small memory allocator unless indicated otherwise.) To reduce this overhead, the small memory allocator may initially allocate a warehouse for a bin that contains only a few lockers. When additional warehouses for that bin are needed, they can be allocated with increasingly more lockers. Thus, the small memory allocator may dynamically adjust the number of lockers in a warehouse based on the allocation pattern of the program.

Figure 4:
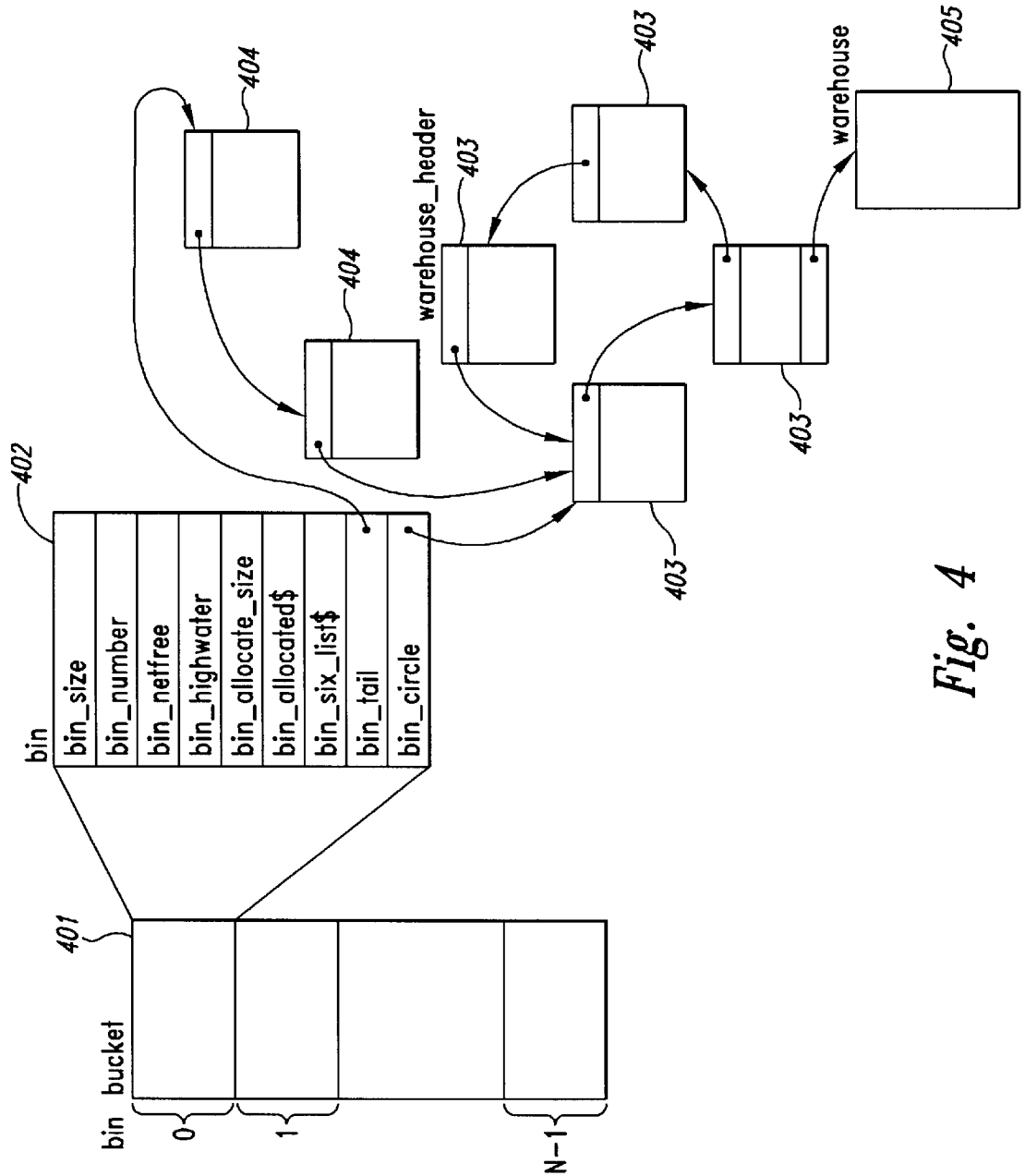
FIG. 4 is a block diagram illustrating an example implementation of the bucket array and the warehouse data structures.

FIG. 4 is a block diagram illustrating an example implementation of the bucket array and the warehouse data structures. The bucket array 401 contains bin data structures. Each bin data structure 402 within the bucket array contains variables associated with that bin. Table 1 contains a description of each of the variables of the bin data structure.

TABLE 1

| Name | Description |
| --- | --- |
| bin_size | size of the blocks of data associated with this bin |
| bin_highwater | maximum number of the lockers that have been simultaneously allocated for the current collection of warehouses |
| bin_netfree | net number of frees since the highwater mark was last increased |
| bin_allocated$ | set to 1 when at least one warehouse header is in the six list (future synchronization mode) |
| bin_circle | points to the first warehouse header in circle portion of the six list |
| bin_tail | points to the end warehouse header in the tail portion of the six list |
| bin_six_list$ | control access to the six list (sync synchronization mode) |

Each bin points to a six list data structure that contains warehouse headers 403 and 404. The bin data structure contains a pointer ("bin_circle") to the circle portion of the six list data structure and a pointer ("bin_tail") to the tail portion of the six list data structure. Each warehouse header in the circle portion of the six list data structure contains a pointer ("wh_base$") to a warehouse data structure that contains blocks of memory of the size associated with the bin.

The memory allocator determines when to allocate a new warehouse for a bin based on the maximum number of lockers ("bin_highwater") that have been simultaneously allocated for the warehouses currently in the bin. If that maximum number, referred to as the "highwater mark," equals the number of lockers currently in the bin, then a new warehouse is allocated. The highwater mark is incremented whenever an allocation request is received and the net number of frees ("bin_netfrees") since the highwater mark was last incremented is zero. The net number of frees is incremented when a locker is freed, and the net number of frees is decremented when a locker is allocated as long as the net number is greater than zero.

Figure 5:
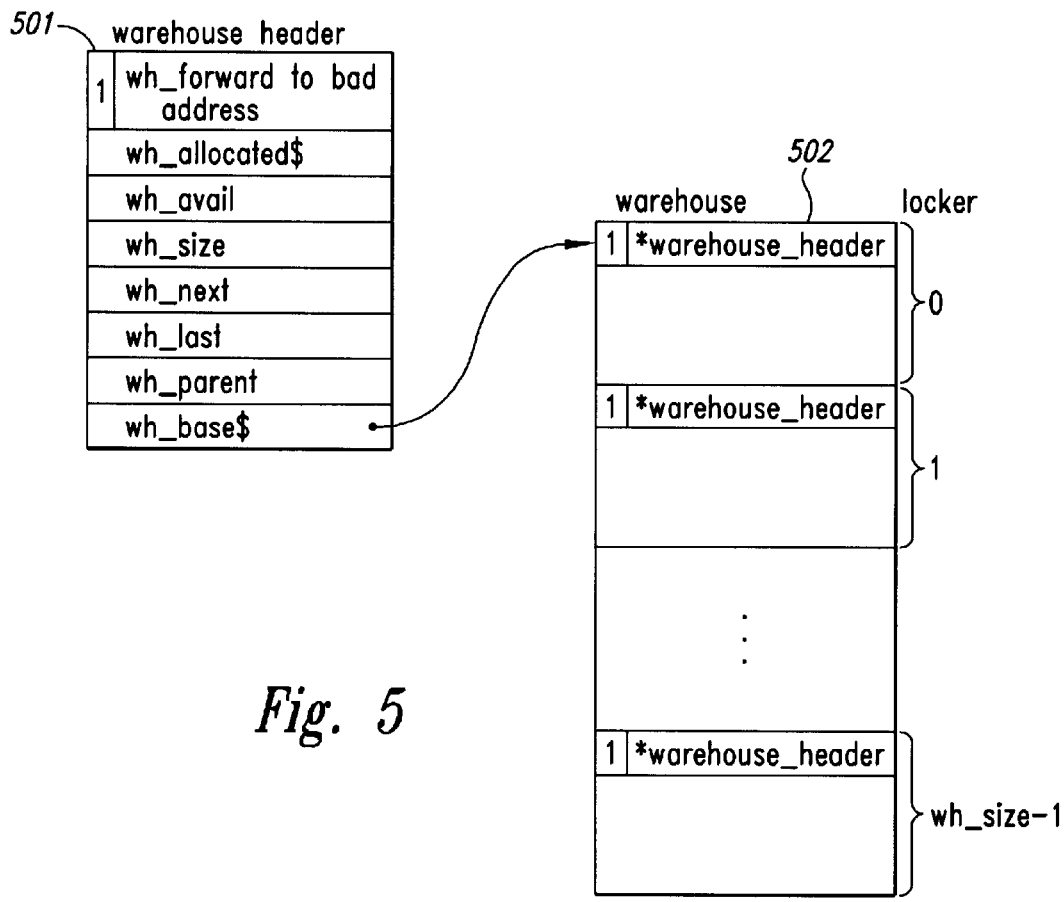
FIG. 5 is a block diagram illustrating the warehouse header data structure and the warehouse data structure.

FIG. 5 is a block diagram illustrating the warehouse header data structure and the warehouse data structure. Table 2 contains a description of each of the variables of the warehouse header data structure 501.

TABLE 2

| Name | Description |
| --- | --- |
| wh_forwarded_to_bad_address | points to an invalid memory address and has its forward bit set |

TABLE 2-continued

| Name | Description |
| --- | --- |
| wh_avail | number of available lockers in the warehouse |
| wh_bitvector$ | bit vector with a bit for each locker in the warehouse (sync synchronization mode) |
| wh_next | points to next warehouse header in either the circle portion or tail portion of the six list |
| wh_last | points to previous warehouse header in the circle portion of the six list |
| wh_base$ | points to base address of the warehouse (future synchronization mode) |

The warehouse data structure 502 contains a number of lockers of the size associated with the bin ("bin_size"). Each locker contains a locker header that contains a pointer to the warehouse header and has its forward bit set. The program uses the portion of the locker following the locker header (i.e., the block of memory) and is unaware of the locker header. When the program frees a block of memory, the memory allocator uses the locker header to locate the warehouse header for that block of memory. Also, if the program accesses the warehouse header (e.g., when writing past the end of an array), the access is forwarded to the first word of the warehouse header which is in turn forwarded to an invalid memory address which causes an exception to be raised. Thus, some accesses past a block of allocated memory can be detected. When freeing a block of memory, the memory allocator accesses the locker header with forwarding disabled so that it can retrieve the address of the warehouse header stored in the locker header.

Figure 6:
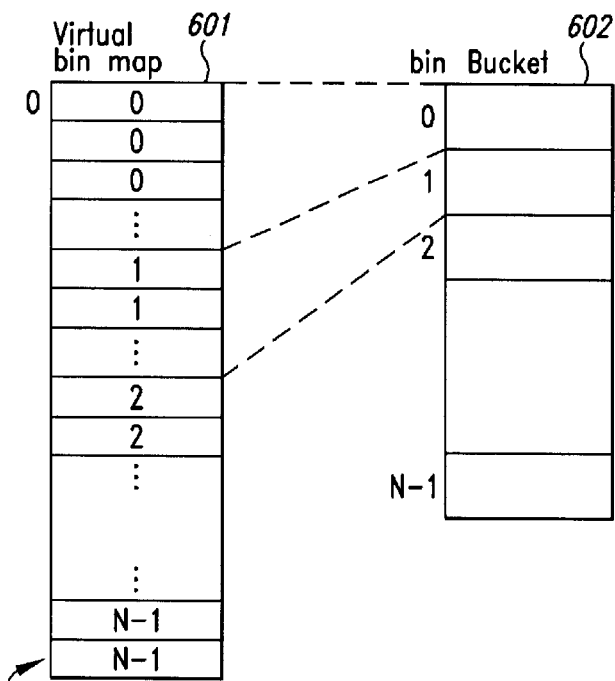
FIG. 6 is a block diagram illustrating the virtual bin to actual bin mapping.

FIG. 6 is a block diagram illustrating the virtual bin to actual bin mapping. The virtual bin map 601 contains a bin for each of the virtual bins. Each virtual bin contains in index of that actual bin in the bucket array 602. As described above, in one embodiment, each virtual bin represents blocks of a certain defined size. For each power of 2, there is a fixed number of virtual bins distributed between that power of 2 and the next power of 2. That number of virtual bins is preferably a power of 2 (e.g., 24).

Figure 7:
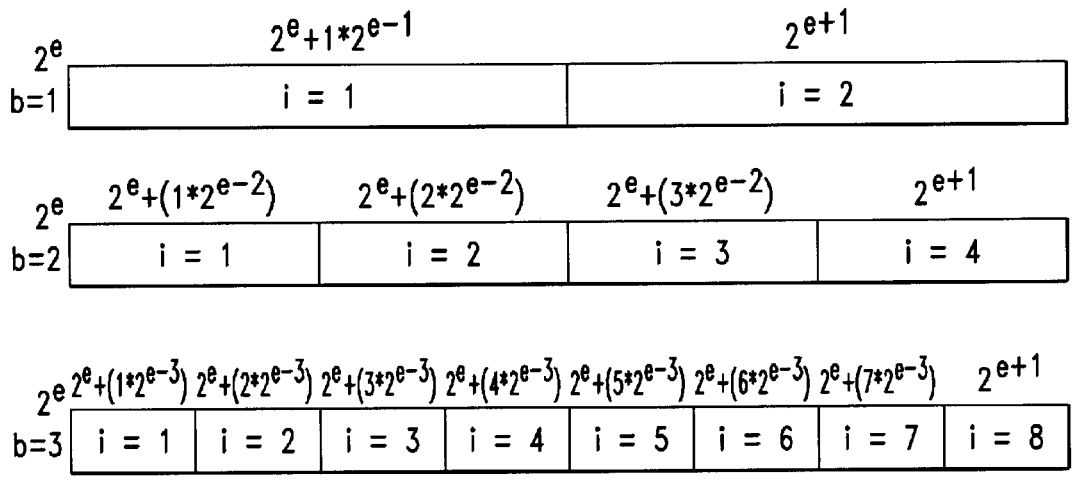
FIG. 7 illustrates the defined sized for virtual bins for various values of 6.

When the memory allocator receives a memory allocation request it needs to map the size of the request to a virtual bin. FIG. 7 illustrates the defined sized for virtual bins for various values of 6. One technique for mapping the size ("N") to a virtual bin ("v") where the fixed number of bins is $2^b$ is as follows:

find smallest e such that $2^e+1>=N$ $r=N-2^e$ $r=r/2^{e-b}$ $v=e*2^b+r$

Another technique for mapping the size to a virtual bin is to convert N to a floating point representation and shift the bits of the floating point representation right $E_0-b$ and adjust for exponent bias if necessary, where $E_0$ is the bit number of the lowest order bit of the exponent of the floating point number.

Figure 8:
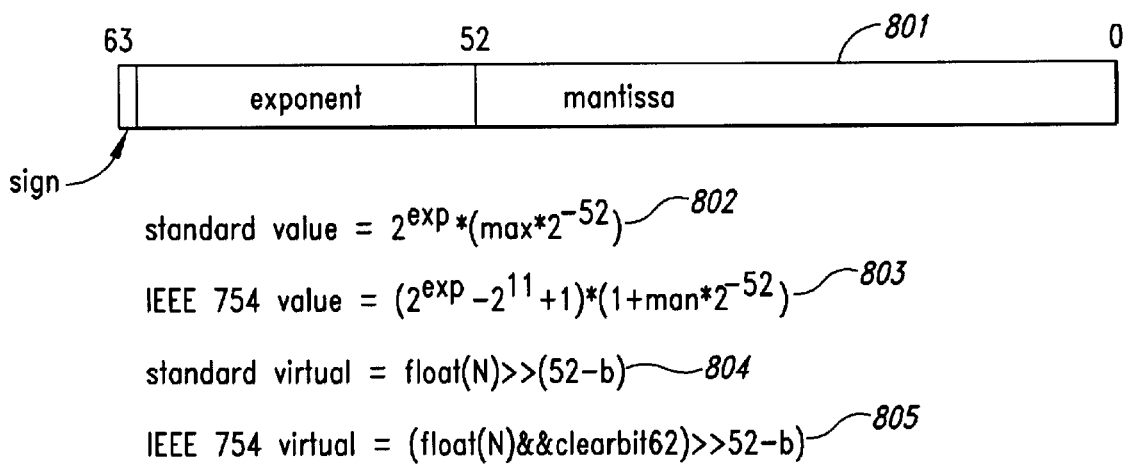
FIG. 8 illustrates a typical floating point representation.

FIG. 8 illustrates a typical floating point representation. A typical floating point representation 801 is 64 with bits 0–51 representing the mantissa, bits 52–62 representing the exponent, and bit 63 representing the sign bit. In a standard representation, the exponent is represented as an 11-bit signed integer and the mantissa has a 1 in its most significant bit. The value in the standard representation is shown in equation 802. In the IEEE 754 representation, the exponent is biased by 1024 and the mantissa has an assumed 1 in the 20 position. The value in the IEEE 754 representation is shown in equation 803. Equation 804 illustrates the use of the standard representation to calculate virtual bin number associated with the number N. Equation 805 illustrates the use of the IEEE 754 representation to calculate the virtual bin number associated with the number N.

Figure 9A:
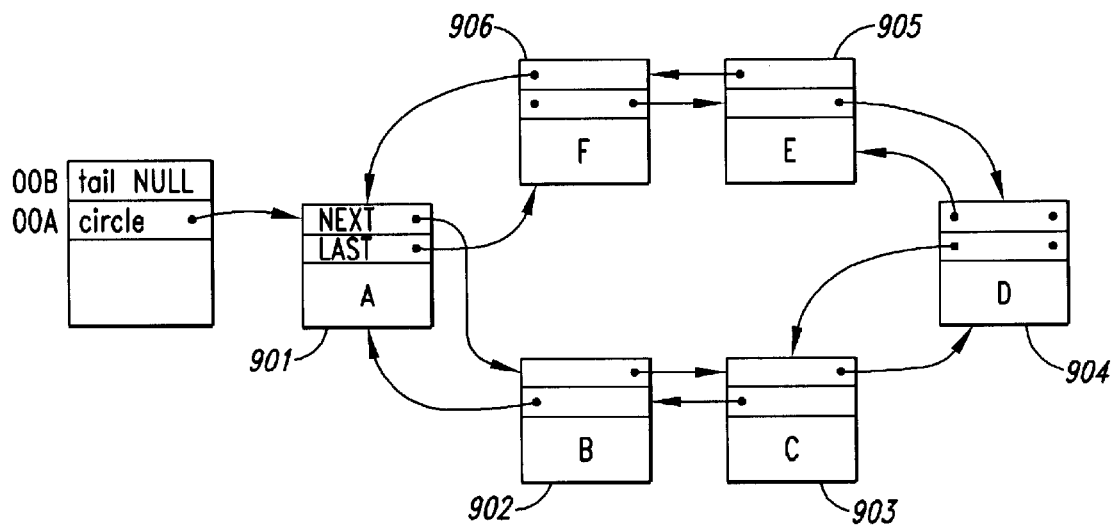
FIG. 9A illustrates a six list with no items in the tail portion.

FIGS. 9A–9E illustrate the operation of a six list data structure. A six list data structure is a circular list that has the characteristic that an item in the circular list can be removed by a thread while other threads are simultaneously accessing the circular list. Thus, a locking mechanism is not needed to limit access to the circular list when an item is being removed, that is, other than to prevent multiple threads from simultaneously adding or removing items from the circular list. The six list data structure has a circle portion and a tail portion. The circle portion contains those items that are currently in the circular list, while the tail portion contains those items that have been removed from the circular list. FIG. 9A illustrates a six list with no items in the tail portion. The six list data structure contains a pointer 900A to the circle portion and a pointer 900B to the tail portion. In this example, the pointer to the circle portion points to item 901, and the pointer to the tail portion is NULL because the tail portion is empty. The circle portion contains six items 901–906. Each item contains a next pointer and a last (or previous) pointer. In this example, the circle portion is a doubly linked list. However, a six list may be implemented as a singly linked list. The pointer to the circle portion points to be "first" item of the circle portion 901, and the last pointer of the "first" item points to the "last" item of the circle portion 906.

Figure 9B:
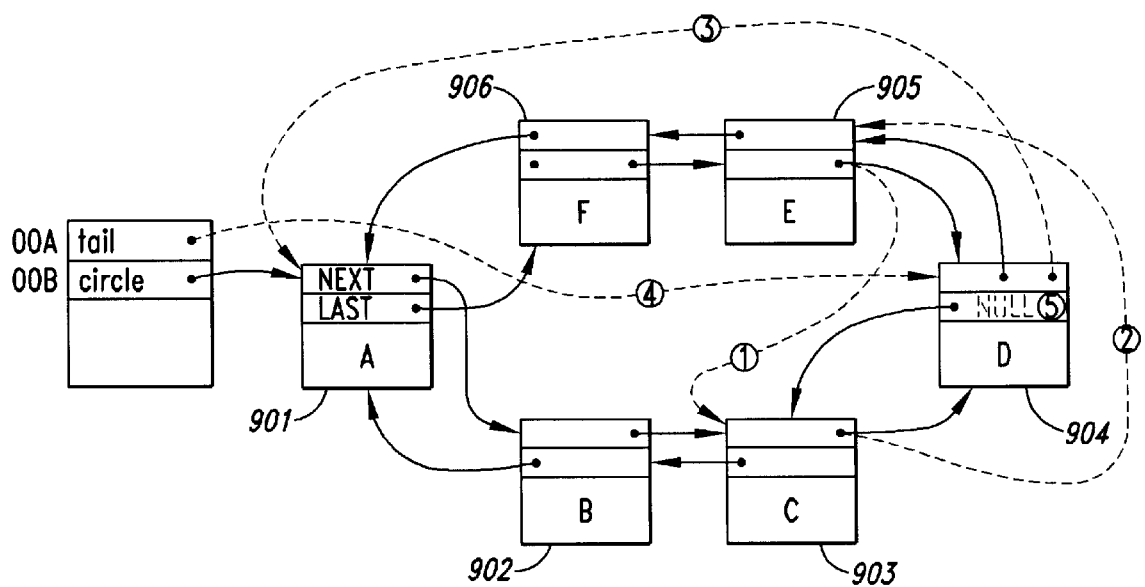
FIG. 9B illustrates the removing of an item from the circle portion of a six list.
Figure 9C:
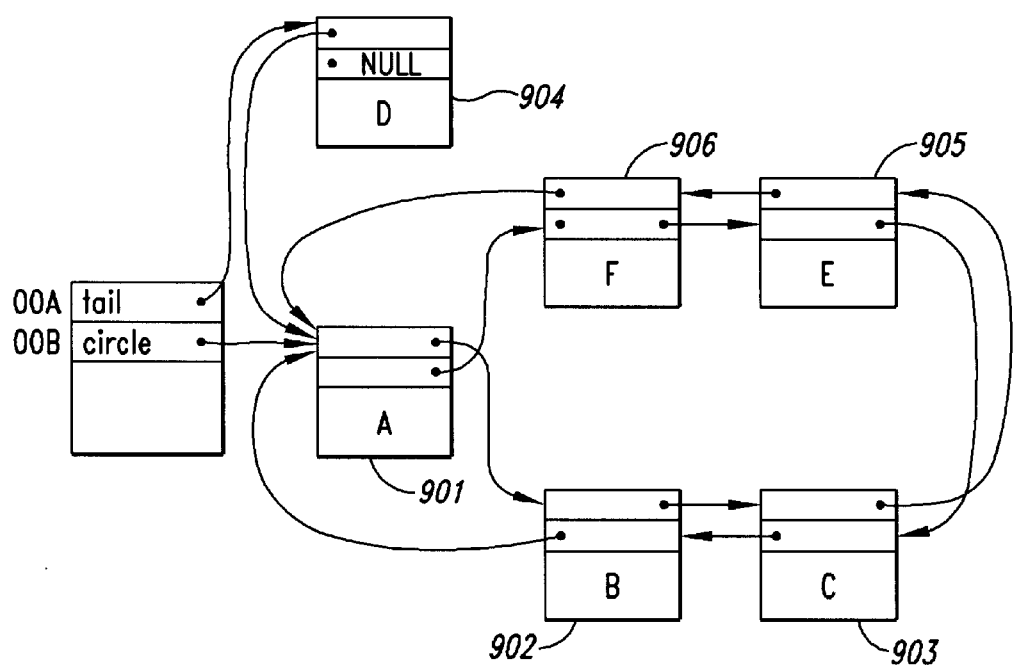
FIG. 9C illustrates the linkage of the six list after item 904 has been removed.

FIG. 9B illustrates the removing of an item from the circle portion of a six list. The solid lines represent the linkage of the six list before the item is removed, and the dashed lines represent the linkage of the six list after the item is removed. In this example, item 904 is removed from the circular portion. First, the last pointer of the next item 905 (i.e., next after the item being removed) in the circle portion is set to point to the previous item 903 in the circular portion as indicated by the dashed line 1. Next, the next pointer of the previous item 903 is set to point to the next item 905 in the circle portion. This effectively removes item 904 from the circle portion. However, item 904 still points to an item in the circle portion. Thus, if another thread has a pointer to item 904, that thread can follow the next pointer of item 904 to access an item that is still in the circle portion. The removed item has a field indicating (e.g., "wh_avail==0") that the accessing thread should look to the next item. In one embodiment, the next pointer of the item being removed is set to point to the first item 901 in the circle portion as shown by dashed line 3. The pointer 900B to the tail portion is set to point to removed item 904 as indicated by dashed line 4. Finally, the last pointer of item 904 is set to NULL. If the six list can be traversed in the reverse direction, then the last pointer is set to point to the same item as the next pointer. FIG. 9C illustrates the linkage of the six list after item 904 has been removed.

Figure 9D:
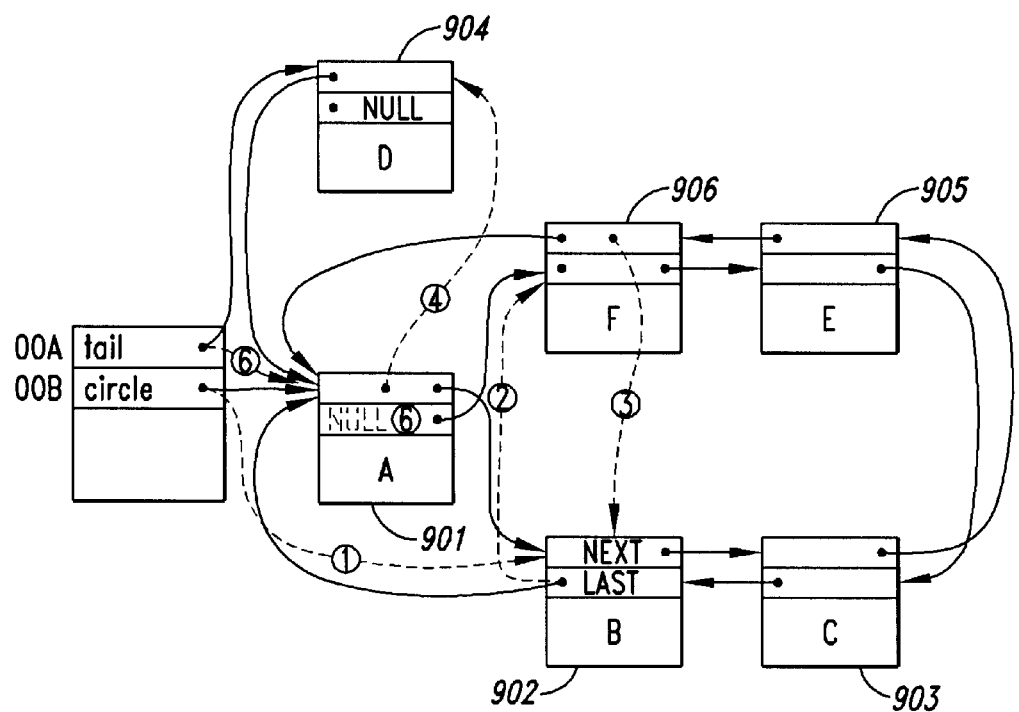
FIG. 9D illustrates the removing of another item from the circle portion of the six list.
Figure 9E:
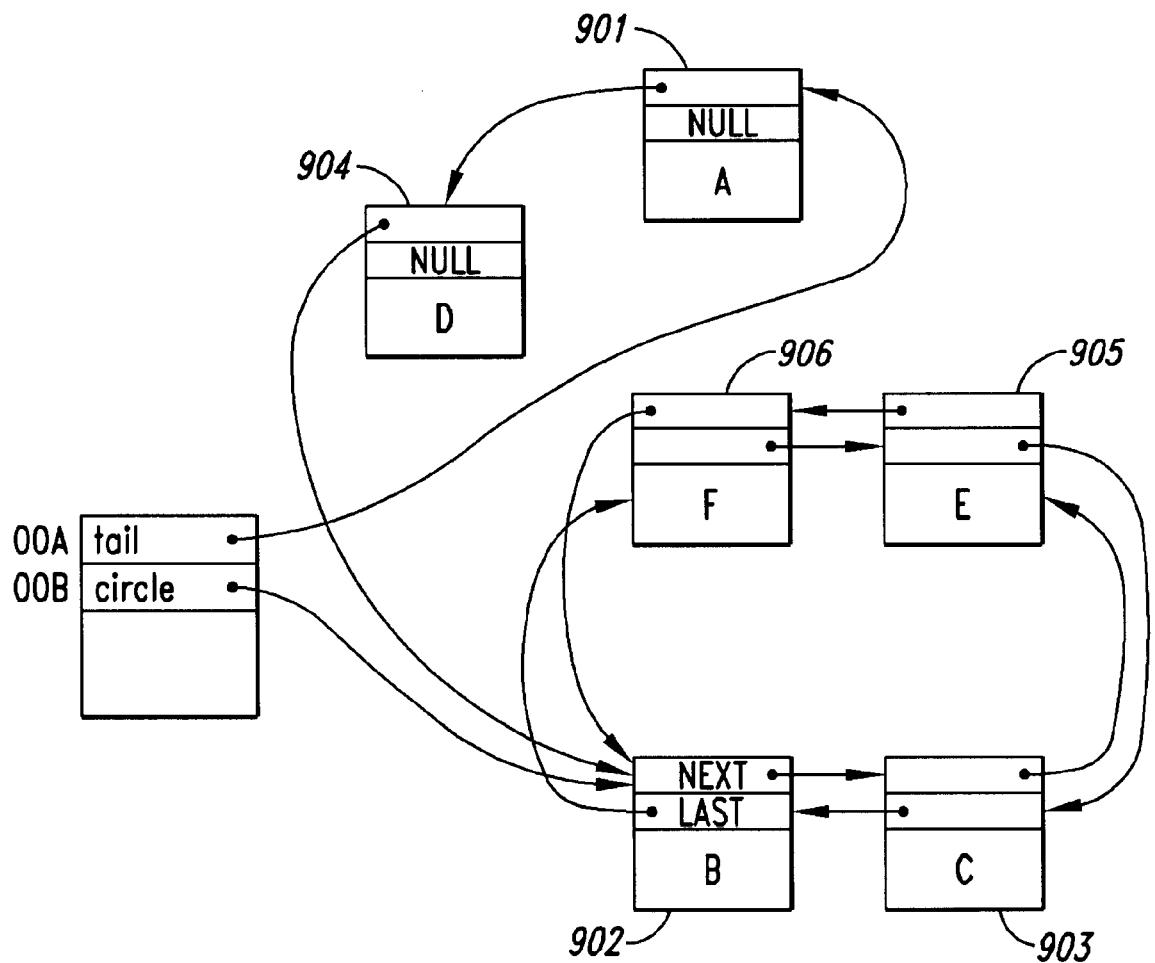
FIG. 9E illustrates the six list data structure after items 904 and 901 have been removed from the circle portion.

FIG. 9D illustrates the removing of another item from the circle portion of the six list. In this example, item 901 is to be removed from the circular list. First, since the item 901 to be removed is the first item in the circle portion, the pointer to the circle portion is set to point to the next item 902 in the circle portion as shown by dashed line 1. The last pointer of the next item 902 is set to point to the previous item 906 in the circle portion as indicated by dashed line 2. The next pointer of the previous item 906 in the circle portion is set to point to the next item 902 in circle portion as indicated by dashed line 3. The next pointer of the removed item 901 is set to point to the end of the tail portion, which is item 904 as indicated by dashed line 4. The last pointer of the removed item 901 is then set to NULL as indicated by 5. The pointer 900B to the tail portion is set to point to the new end item 901 of the tail portion as indicated by dashed line 6. The tail portion now contains item 904, which is the first item of the tail portion, and item 901, which is the last item of the tail portion. FIG. 9E illustrates the six list data structure after items 904 and 901 have been removed from the circle portion. The name of the six list data structure is derived from the shape of resulting circle portion and tail portion which resembles the number "6."

Figure 10:
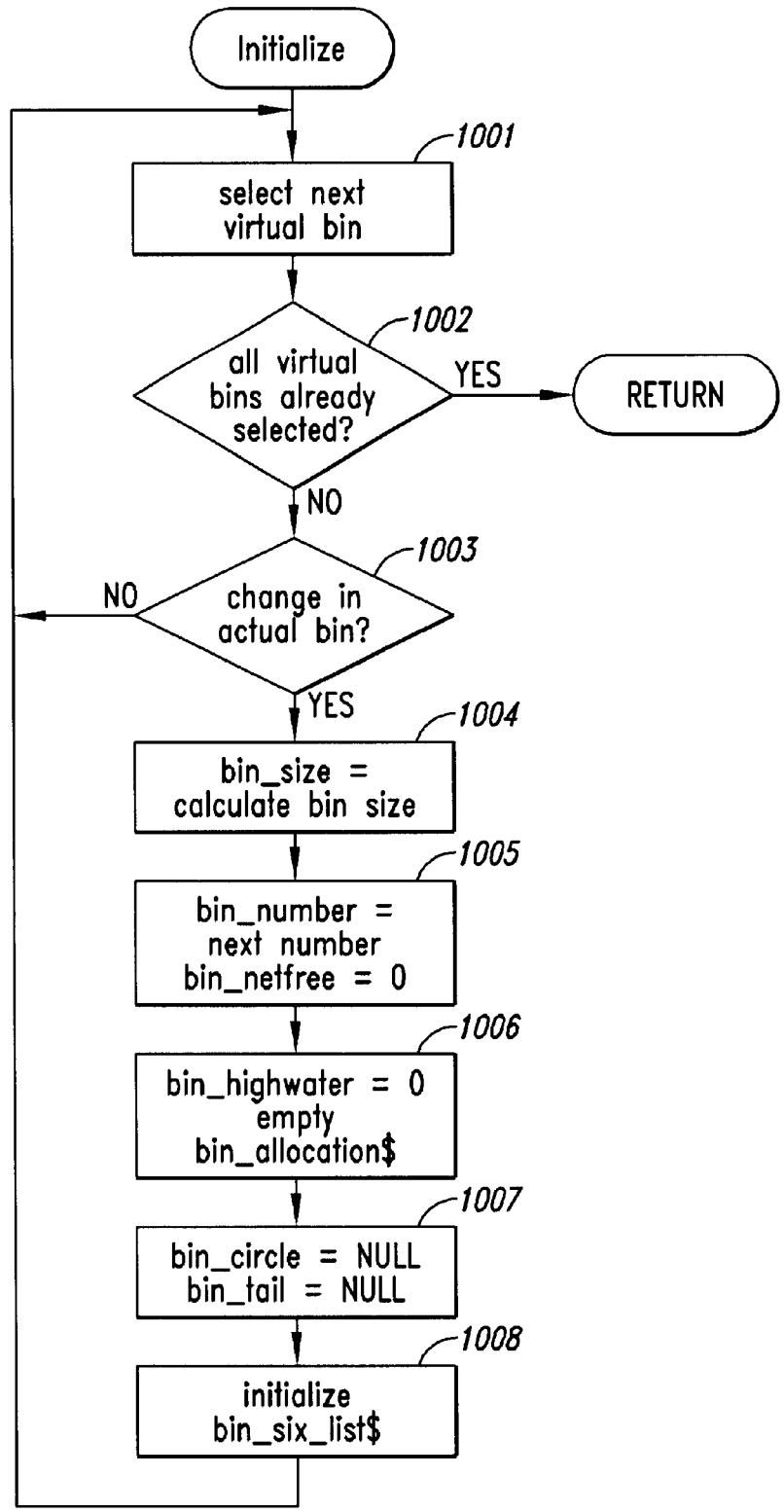
FIG. 10 is a flow diagram of an example implementation of an initialize routine of the initialize memory component.

FIG. 10 is a flow diagram of an example implementation of an initialize routine of the initialize memory component. This routine initializes each of the bin data structures of the bucket array. This routine loops selecting each virtual bin and determining whether it maps to an actual bin whose bin data structure has not yet been initialized. When looping through the virtual bin map, the routine determines that a bin data structure is to be initialized when the actual bin numbers of two consecutive virtual bin numbers are different. In step 1001, the routine selects the next virtual bin, starting with the first. The virtual bins are indexed from 0 to the number of virtual bins minus 1. In step 1002, if all the virtual bins have already been selected, then the routine returns, else the routine continues at step 1003. In step 1003, if the selected virtual bin maps to an actual bin different from the actual bin of the next virtual bin to be selected, then the routine continues at step 1004, else routine loops to step 1001 to select the next virtual bin. In steps 1004–1008, the routine initializes the bin data structure to which the selected virtual bin maps. In step 1004, the routine calculates the size ("bin_size") of the actual bin. In one embodiment, the routine calculates the bin size by performing the inverse of the technique which calculates a virtual bin number from a memory size. in step 1005, the routine initializes the bin number ("bin_number") starting at 0 and initializes the net number ("bin_netfree") of free lockers to 0. In step 1006, the routine initializes the highwater number ("bin_highwater") of lockers to 0 and sets the full/empty bit of a variable ("bin_allocated$") to empty to indicate that no memory has yet been allocated to a selected actual bin. In step 1007, the routine sets the pointer ("bin_circle") to the circle portion and the pointer ("bin_tail") to the tail portion of the six list to NULL. In step 1008, the routine initializes a synchronization variable ("bin_six_list$") for the six list. The routine then loops to step 1001 to select the next virtual bin.

Figure 11:
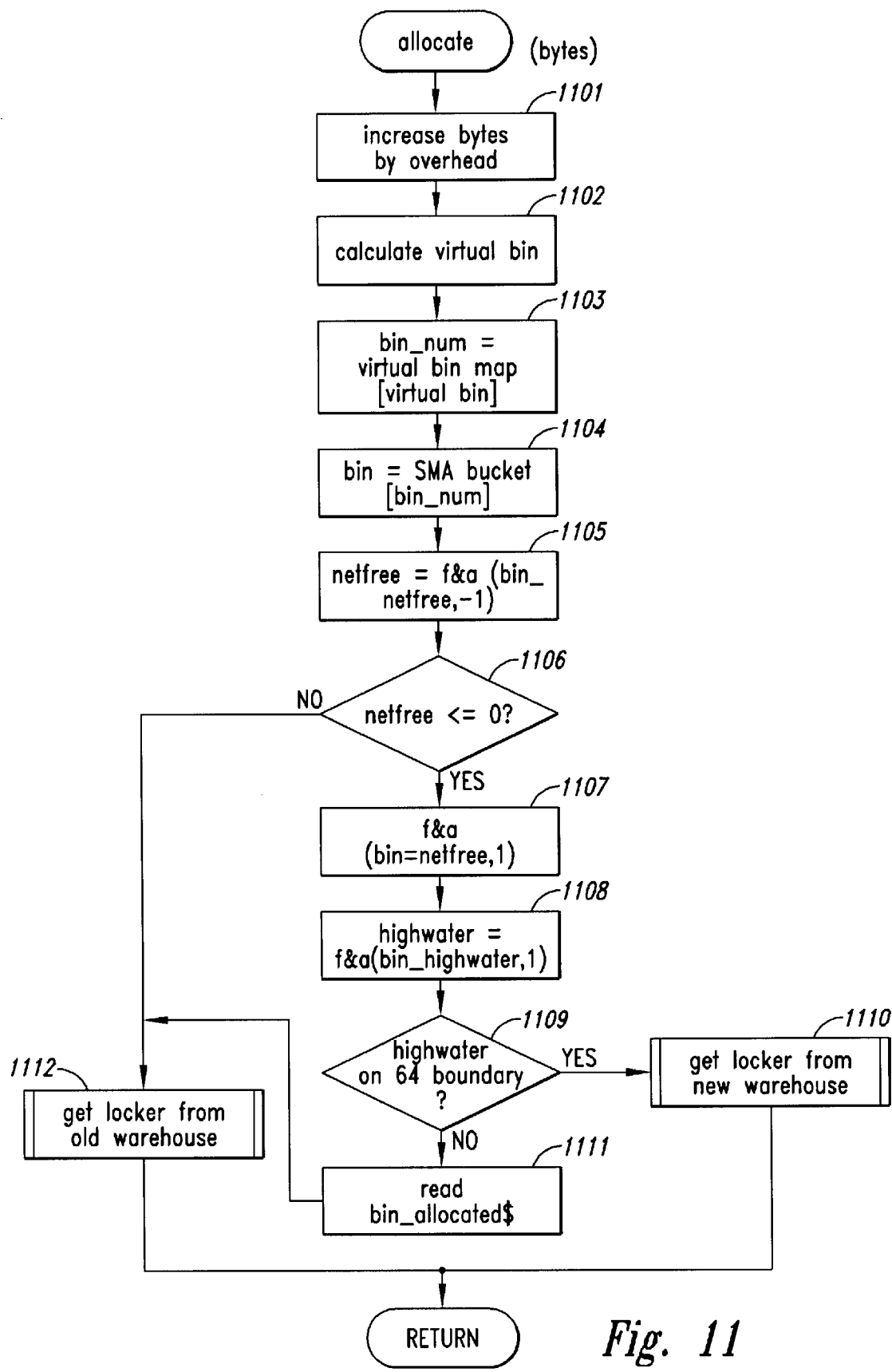
FIG. 11 is a flow diagram of an example implementation of an allocate routine of the allocate memory component.

FIG. 11 is a flow diagram of an example implementation of an allocate routine of the allocate memory component. This routine is passed the number of bytes to be allocated and returns a pointer to a block of memory that contains at least that number of bytes. In step 1101, the routine increases the number of bytes by the overhead amount of bytes, which represents the number of additional bytes used by the memory allocator to track a block. In this embodiment, only one extra word, the locker header is needed. In step 1102, the routine calculates the virtual bin number of the virtual bin that contains that increased number of bytes using the floating point technique described above. In step 1103, the routine maps that virtual bin number to the actual bin number. In step 1104, the routine retrieves the pointer to the bin data structure for that actual bins which is used to access the bin data structure in the following. In step 1105, the routine fetches and adds a −1 to the net number ("bin_netfree") of free lockers for the bin. In step 1106, if the number of net free lockers is less than or equal to 0, then the routine continues at step 1107, else the routine continues at step 1112. Steps 1107–1111 are executed when the net number of free lockers is less than or equal to 0 before being decremented in step 1105, which means that a new warehouse is allocated if the highwater mark is at a 64 locker boundary. In step 1107, the routine fetches and adds a 1 to the net number of free lockers for the bin to undo the fetch and add of step 1105. In step 1108, the routine fetches and adds a 1 to the highwater mark ("bin_highwater") for the bin. In step 1109, if the highwater mark is on a 64 locker boundary, then the routine continues at step 1110, else routine continues at step 1111. In step 1110, the routine invokes a function to get a locker from a new warehouse and then returns. That routine allocates a new warehouse and adds a warehouse header to the circle portion of the six list. In step 1111, the routine reads a variable ("bin_allocate$") with a future synchronization mode that indicates whether this bin has at least one warehouse header. In step 1112, the routine invokes a function to get a locker from an existing warehouse and then returns.

Figure 12:
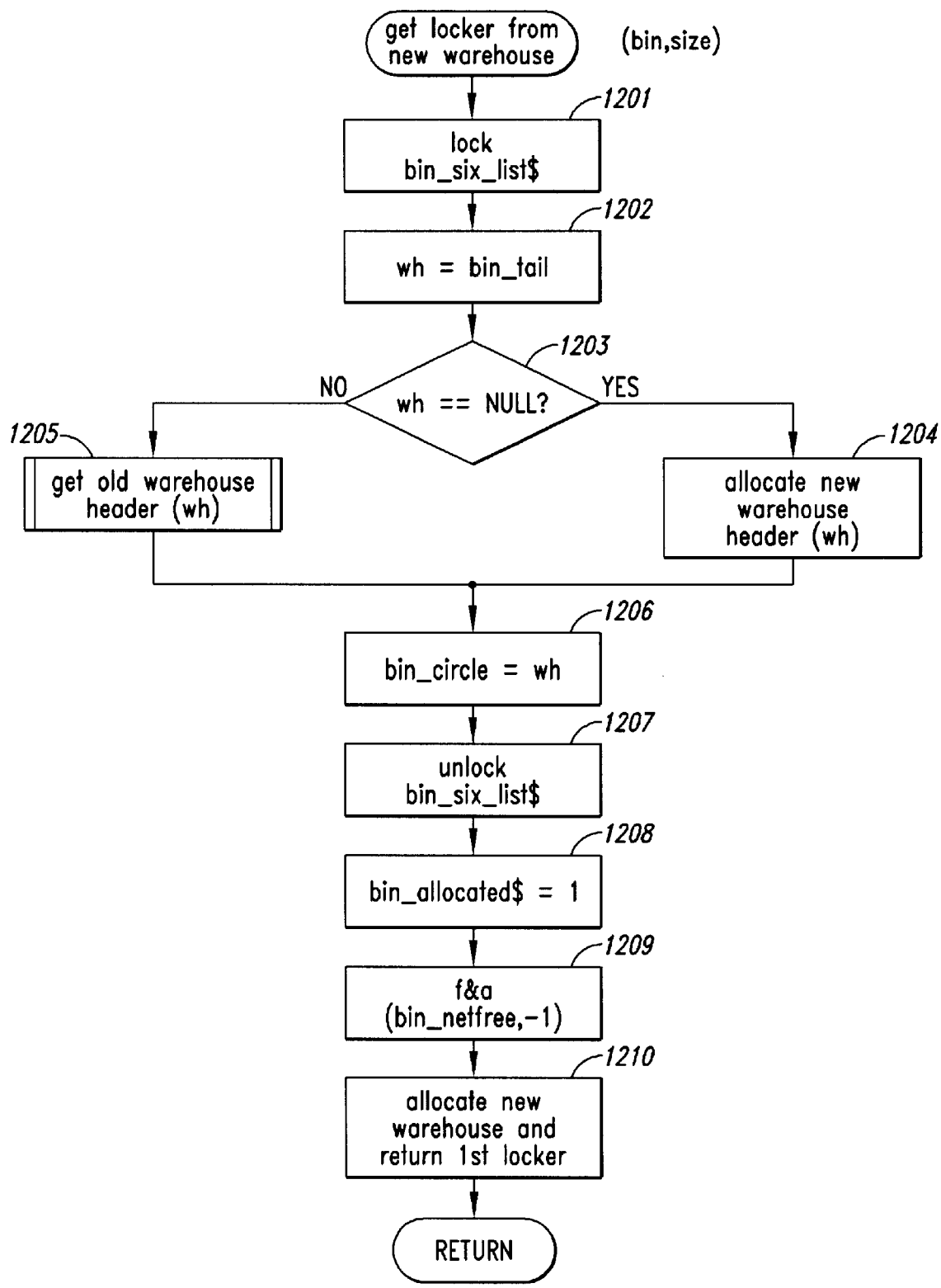
FIG. 12 is a flow diagram of a routine to get a locker from a new warehouse.

FIG. 12 is a flow diagram of a routine to get a locker from a new warehouse. This routine is invoked when all the lockers in the existing warehouses have been allocated and a new request for a locker has been received. This routine is passed a reference to the bin from which the locker is to be retrieved and the size of the memory request. In the step 1201, the routine locks the six list to prevent multiple threads from adding or removing a warehouse header simultaneously. In step 1202, the routine retrieves a pointer to the tail portion of the six list. In step 1203, if the tail portion of the six list is empty, then the routine continues in step 1204, else routine continues at step 1205. In step 1204, the routine allocates a new warehouse header ("wh"). In step 1205, the routine invokes a function to get a warehouse header ("wh") from the tail portion of the six list. In step 1206, the routine sets the pointer ("bin_circle") to the circle portion to point to the warehouse header. Thus, warehouse headers are added as the first item in the six list. In step 1207, the routine unlocks the six list. In step 1208, the routine sets a future synchronization variable ("bin_allocated$") to 1 indicate that the circle portion of the six list has a warehouse header. In step 1209, the routine fetches and adds a −1 to the net number ("bin_net_free") of free lockers. This effectively hides the last locker in the warehouse so it is not allocated. The hiding of this last locker has been empirically demonstrated to improve performance of the memory allocation system. In step 1210, the routine allocates a new warehouse and returns the first locker in the warehouse. The memory allocator, in one embodiment, recursively invokes the memory allocator requesting an allocation of a block of memory that is 64 times the size for this bin. If no such blocks are available, the memory allocator again recursively invokes the memory allocator. Eventually, the large memory allocator is invoked. If the large memory allocator does not have sufficient available memory, it invokes the memory allocation routine provided by the operating system.

Figure 13:
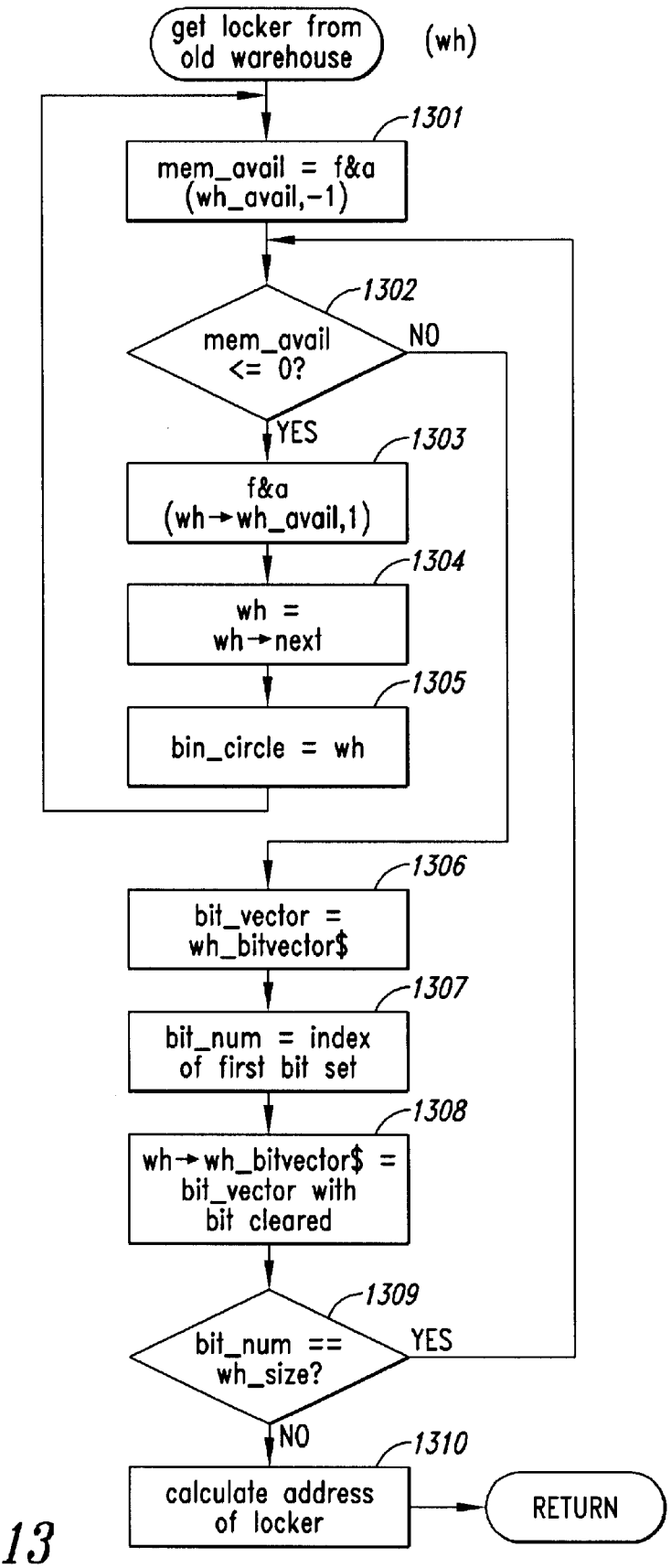
FIG. 13 is a flow diagram of an example implementation of a routine to get a locker from an existing warehouse.

FIG. 13 is a flow diagram of an example implementation of a routine to get a locker from an existing warehouse. This routine is passed a pointer to the warehouse header and returns a pointer to a locker. In steps to 1301–1305, the routine loops through the circle portion of the six list looking for a warehouse that has an available locker. In step 1301, the routine fetches and adds a −1 to the number ("wh_avail") of available lockers for the selected warehouse header. The passed warehouse header is initially selected. In step 1302, if the number of available lockers is less than or equal to 0, then the routine continues at step 1303 to select the next warehouse header, else the routine continues at step 1306. If one of the selected warehouse headers is being removed by another thread. it may point to the tail portion. However, since the number of available lockers of warehouse headers on the tail portion is zero, the thread will eventually select a warehouse header on the circle portion. In steps 1303–1305, the routine selects the next warehouse header in the circle portion. In step 1303, the routine fetches and adds a 1 to the number of available lockers for the selected warehouse header to undo the decrementing of step 1301. In step 1304, the routine select the next warehouse header in the circle portion. In step 1305, the routine sets the pointer ("bin_circle") to the circle portion to point to selected warehouse header. This resetting of the pointer effectively moves the warehouse header for a fully allocated warehouse to the end of the circle portion. The routine then loops to step 1301 to check the selected warehouse header. In step 1306, the routine retrieves the hit vector ("wh_bitvector$") from the selected warehouse header. In step 1307, the routine identifies the bit number of the right-most bit that is set in the bit vector. In step 1308, the routine clears that bit in the bit vector and stores it in the bit vector ("wh_bitvector$") for the warehouse header. In step 1309, if the bit number equals the number of lockers in the warehouse ("wh_size"), which means that another stream has allocated a locker from the selected warehouse since this stream checked the warehouse header in step 1302, then routine loops to step 1302, else routine continues at step 1310. In step 1310, the routine calculates the address of the locker indicated by the bit number (i.e., wh_base$+(bin_size*bit_num)) and returns.

Figure 14:
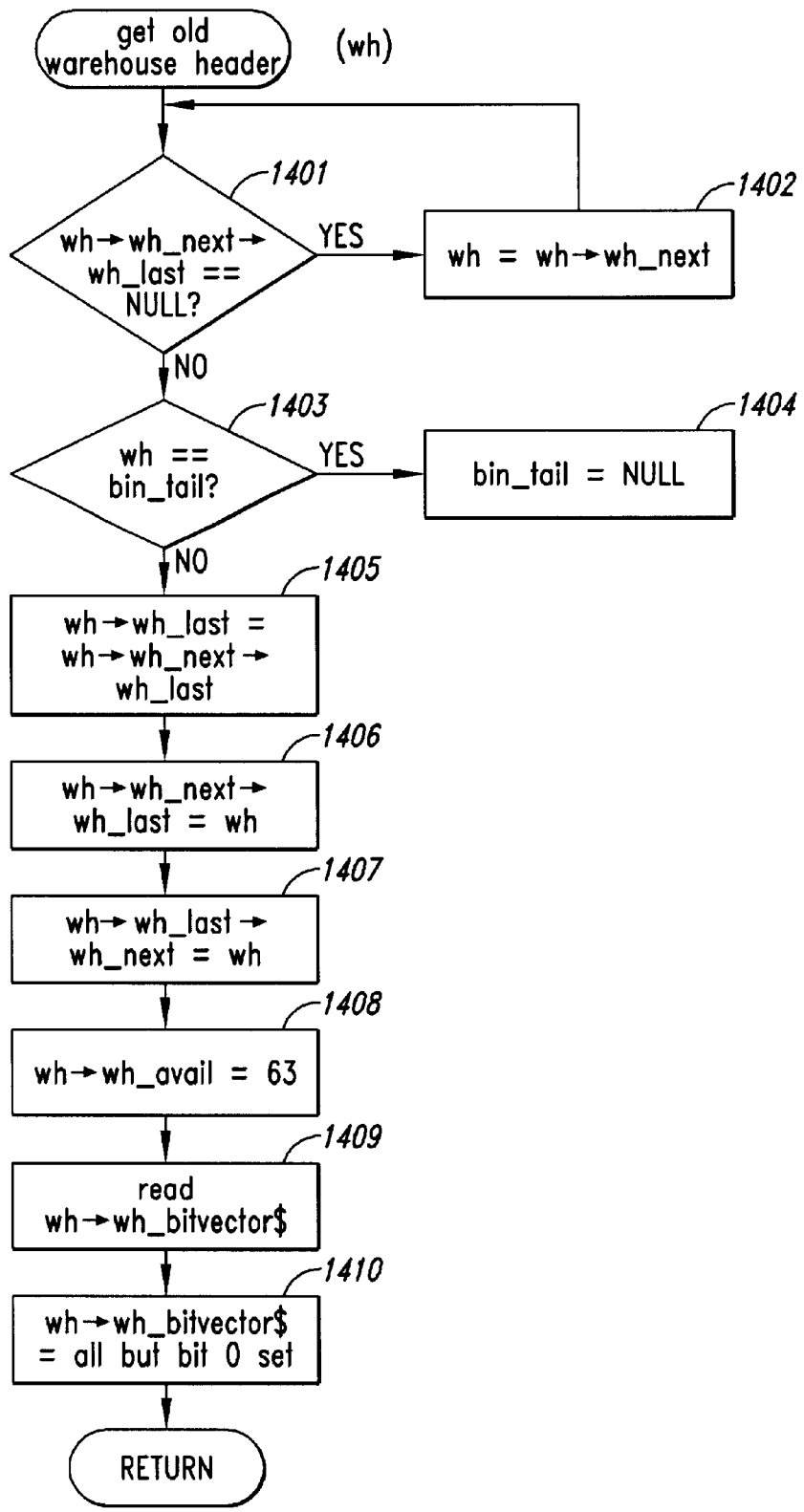
FIG. 14 is a flow diagram of a routine that gets an old warehouse header from the tail portion of the six list.

FIG. 14 is a flow diagram of a routine that gets an old warehouse header from the tail portion of the six list. The routine is passed a pointer ("wh") to the end of the tail portion of the six list and returns a pointer to a warehouse header that is added to the circle portion of the six list. In step 1401–1402, the routine searches for the warehouse header at the front of the tail portion. In step 1401, if the selected warehouse header points to a warehouse header that is on the tail portion of the six list (i.e., the selected warehouse header is not the first on the tail portion), then the routine continues at step 1402, else the routine continues at step 1403. In step 1402, the routine selects the next warehouse header on the tail portion of the six list and loops to step 1401. In step 1403, if the pointer ("bin_tail") to the tail portion of the six list ("bin_tail") points to be selected warehouse header, then the tail portion of the six list has only one warehouse header and the routine continues at step 1404, else routine continues at step 1405. In step 1404, the routine sets the pointer to the tail portion to NULL. In step 1405–1408, the routine inserts the selected warehouse header in the circle portion of the six list of the circle. The next pointer ("wh_next") of the selected warehouse header already points to a warehouse header of the circle portion because it was the first warehouse header in the tail portion. In steps 1405–1407, the routine links the related warehouse header into the circle portion. In step 1408, the routine sets the number of available lockers to 63. In step 1409, the routine reads the synchronized bit vector ("wh_bitvector$"). In step 1410, the routine sets all but the zero bit of the bit vector and returns. While a warehouse header is being added, another thread may be looping through the circle portion looking for a warehouse header with an available locker. Once the warehouse header is added, the looping thread will notice that memory is available, allocate a locker, and then read a future synchronization variable ("wh_base$") and wait until the base address of the warehouse is stored in that variable.

FIG. 15 an example implementation of a free memory routine. This routine is passed a pointer to a block of memory to be freed. In step 1501, the routine adjusts the pointer by the amount of overhead in the locker to point to the start of the locker. The first word of the locker points to the warehouse header of the warehouse that contains the locker. In step 1502, the routine calculates the offset of the returned locker in the warehouse by subtracting the adjusted pointer from the base address ("wh_base$") of the warehouse. In step 1503, the routine calculates the bit number of the returned locker by dividing the offset by the size ("bin_size") of the lockers in the warehouse. Although not shown in the various diagrams, each warehouse header has a pointer to the corresponding bin data structure so that the variables in the bin data structure can be retrieved when freeing a block. In step 1504, the routine reads the bit vector ("wh_bitvector$") from the warehouse header. In step 1505, the routine sets the calculated bit number in the bit vector for the warehouse header to indicate that the locker is now available. In step 1506, the routine fetches and adds a 1 to the net number ("bin_netfree") of free lockers in the bin. In step 1507, the routine fetches and adds a 1 to the number of available lockers in the warehouse ("wh_avail") and returns.

FIG. 16 is a flow diagram of an example implementation of a routine to free a warehouse whose lockers are all free. This routine is passed the warehouse header of a warehouse that is to be returned. In step 1602, the routine retrieves the bit vector ("bin_bitvector$") from the warehouse header of the warehouse being returned. In step 1603, if all the bits in the bit vector are 1's, then the routine continues at step 1609, else another thread has recently allocated a locker from this warehouse and the routine continues at step 1604. In step 1604, the routine restores the bit vector and returns. In step 1609, the routine sets a free number to be size ("wh_size") of the warehouse minus 1 to account for a hidden locker. In step 1610, the routine fetches and adds the negative value of the free number to the net number of free lockers in the bin. In step 1611, the routine sets the available number of lockers in the warehouse header to 0 to ensure that no thread that still has a pointer to the warehouse header will attempt to allocate from the warehouse. In step 1612, the routine clears any data trap bits of the warehouse. In step 1613, the routine de-allocates the warehouse by invoking the free memory component. In step 1614, the routine sets the full/empty bit of the pointer to the base ("wh_base$") of the warehouse to empty. In step 1615, the routine locks the six list. In step 1616, routine invokes a function to move the warehouse header to the tail portion of the six list. In step 1617. the routine unlocks the six list and returns.

FIG. 17 is a flow diagram of an example implementation of a routine that moves a warehouse header to the tail portion of the six list. This routine is passed a pointer to the warehouse header. In step 1701, if the warehouse header to be returned is the first warehouse header of the circle portion, then the routine sets the pointer ("bin_circle") to the first warehouse header of the circle portion to point to the next warehouse header in the circle portion in step 1702. In step 1703, the routine sets the last pointer of the new first warehouse header of the circle portion to point to the last warehouse header in the circle portion. In step 1704, the routine sets the last warehouse header in circle portion to point to the new first warehouse header of the circle portion. In step 1705, if the tail portion of the circle is not empty, then the routine continues at step 1706, else the routine continues at step 1712. In step 1706, the routine retrieves a pointer to the last warehouse header in the tail portion. In steps 1707–1708, the routine loops until it locates the first warehouse header in the tail portion. In step 1709, if the first warehouse header in the tail points to the warehouse header to be moved onto the tail portion, then routine continues at step 1710, else the routine continues at step 1711. In step 1710, the routine sets the first warehouse header in the tail portion to point to the warehouse header that is now the first warehouse header of the circle. In step 1711, the routine sets the warehouse header that is being moved to the tail portion to point to the warehouse header currently at the end of the tail portion. In step 1712, the routine sets the next pointer of the warehouse header to be moved to the tail portion to point to the first warehouse header in the circle. On the assumption that the warehouse of the first warehouse is most likely to have an available locker. In step 1713. the routine sets the last pointer of the warehouse header that has been moved to the tail portion to NULL. The routine also sets the pointer to the tail portion to point to the warehouse header just added to the tail portion and returns.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method in a computer system for removing an item from a circular list that is simultaneously accessible by multiple threads of execution, each item pointing to a next item in the circular list, the method comprising:

during execution of one thread,
identifying an item to be removed from the circular list;
setting the item before the identified item to point to the item after the identified item; and
ensuring that the identified item points to an item of the circular list so that when another thread accesses the identified item after the identified item has been removed from the circular list, the identified item still points to a next item on the circular list.

2. The method of claim 1 wherein the circular list is doubly linked and each item includes a pointer to a previous item, and including:
setting the item after the identified item to point to the item before the identified item.

3. The method of claim 2 wherein the circular list is only traversed in the direction of the next item.

4. The method of claim 1 including setting an indication in the identified item so that when the other thread access the identified item after the identified item has been removed from the circular list, the other thread will proceed to the next item pointed to by the identified item.

5. The method of claim 1 wherein the ensuring that the identified item points to an item of the circular list includes leaving the identified item to point to the item that was the next item before the identified item was removed from the circular list.

6. The method of claim 1 including preventing multiple threads from simultaneously adjusting the number of items in the circular list.

7. The method of claim 1 wherein when another item is removed from the circular list, the other item is set to point to the identified item so that when a thread accesses the other item after the other item has been removed from the circular list, the thread can locate an item still in the circular list through the identified item.

8. The method of claim 1 wherein the circular list and items removed from the circular list form a six list.

9. The method of claim 8 wherein the circular list form a circle portion of the six list and the items removed from the circular list from a tail portion of the circular list.

10. The method of claim 1 wherein the ensuring that the identified item points to an item of the circular list includes setting the identified item to point to another item previously removed from the circular list so that the identified item points to an item of the circular list indirectly through the previously removed item.

11. The method of claim 1 including:
setting a tail pointer to point to the identified item.

12. The method of claim 1 including:
identifying a second item to be removed from the circular list;
setting the item before the second identified item to point to the item after the second identified item; and
setting the second identified item to point to the identified item.

13. The method of claim 12 including:
setting a tail pointer to point to the second identified item.

14. The method of claim 1 wherein the items of the circular list and the items that have been removed form a six list and wherein a removed item is added back to the circular list, by
identifying a removed item;
if the identified removed item does not already point to an item of the circular list, setting the identified removed item to point to an item of the circular list;
setting the item of the circular that is before the item to which the identified removed item points to point to the identified removed item.

15. The method of claim 14 including locking the six list before a removed item is added back to the circular list.

16. The method of claim 14 wherein the identified removed item is the only removed item that points to an item on the circular list.

17. The method of claim wherein items of the circular list are accessible through a circle pointer and items that have been removed are accessible through a tail pointer.

18. A method in a computer system for detecting unauthorized access of a first word of memory, the method comprising:
establishing forwarding for the first word of memory and setting the first word of memory to point to a second word of memory, the second word of memory being a valid memory location; and
establishing forwarding for the second word of memory and setting the second word of memory to point to an invalid memory location
so that when the first word is accessed with forwarding enabled, the access is forwarded to the second word, which is in turn forwarded to the invalid memory location and unauthorized access to the first word is indicated; and
so that when the first word is accessed with forwarding disabled, the pointer to the second word of memory is retrieved and can be used to further access memory.

19. The method of claim 18 wherein the second word of memory is within a data structure that is accessed when the pointer to the second word of memory is retrieved.

20. A computer-readable medium containing a data structure for use in allocating memory, the data structure containing:
a plurality of bins, each bin representing a size of memory that can be allocated from the bin;
for each bin, a circular list of warehouse headers; and
for each warehouse header, a warehouse that contains lockers of the size of memory that can be allocated for the bin.

21. The computer-readable medium of claim 20 wherein a bin contains a pointer to the circular list.

22. The computer-readable medium of claim 20 wherein the circular list is a six list with a circle portion and a tail portion and the bin contains a pointer to the circle portion and a pointer to the tail portion.

23. The computer-readable medium of claim 20 wherein each warehouse header contains a bit vector indicating allocation status of each locker in the warehouse of that warehouse header.

24. The computer-readable medium of claim 23 wherein the bit vector is accessed in a sync synchronization mode.

25. The computer-readable medium of claim 20 wherein each locker of a warehouse contains a pointer to the warehouse header for the warehouse.

26. The computer-readable medium of claim 25 wherein a forward bit of the pointer to the warehouse header is set.

27. The computer-readable medium of claim 26 wherein a forward bit of the word of the warehouse header pointed to by the pointer of a locker is set and the word of the warehouse header pointed to by the pointer of a locker is set to point to an invalid memory location.

28. The computer-readable medium of claim 20 wherein a warehouse header contains a pointer to the warehouse.

29. The computer-readable medium of claim 28 wherein the pointer to the warehouse is accessed in a future synchronization mode.

30. A method in a computer system for allocating memory, the computer system supporting the simultaneous execution of multiple threads, the method comprising:
under control of a thread,
identifying a bin associated with lockers of memory large enough to satisfy a memory allocation request;
when the identified bin has a free locker,
searching a circular list of warehouse headers associated with the identified bin for a warehouse that contains a locker that is available to be allocated; and
allocating the found available locker to satisfy the request;
when the allocated bin has no free lockers
allocating a warehouse with lockers large enough to satisfy the memory allocation request;
adding a warehouse header for the allocated warehouse to a circular list of warehouse headers associated with the identified bin; and
allocating a locker from the allocated warehouse to satisfy the memory allocation request.

31. The method of claim 30 wherein the allocating of a warehouse includes recursively requesting a memory allocation that is large enough to contain multiple lockers for the identified bin.

32. The method of claim 30 wherein when a memory allocation request is for larger than a certain size, using a large memory allocator to allocate the memory.

33. The method of claim 30 wherein access by multiple threads to a warehouse header of the identified bin is coordinated through a synchronization variable with an access mode of sync.

34. The method of claim 33 wherein the synchronization variable is a bit vector with a bit for each locker in the warehouse and each bit indicates whether the locker is allocated.

35. The method of claim 30 wherein the identified bin contains a pointer to the first warehouse header in the circular list and a thread that accesses the circular list changes the pointer to pointer to another warehouse header of the circular list so that a thread that subsequently accesses the circular list will start access at a different warehouse header to minimize attempts at simultaneous access to a warehouse header.

36. The method of claim 30 wherein the identified bin contains a synchronization variable accessed with a future mode to indicate whether the circular list of the bin contains at least one warehouse header.

37. A computer-readable medium containing instructions for controlling a computer system to remove an item from a circular list that is simultaneously accessible by multiple threads of execution, each item pointing to a next item in the circular list, by a method comprising:
    identifying an item to be removed from the circular list;
    setting the item before the identified item to point to the item after the identified item; and
    ensuring that the circular list is accessible through the identified item.

38. The computer-readable medium of claim 37 wherein the circular list is doubly linked and each item includes a pointer to a previous item, and including setting the item after the identified item to point to the item before the identified item.

39. The computer-readable medium of claim 37 wherein the circular list is only traversed in the direction of the next item.

40. The computer-readable medium of claim 37 including setting an indication in the identified item so that when a thread accesses the identified item after the identified item has been removed from the circular list, the thread will proceed to the next item pointed to by the identified item.

41. The computer-readable medium of claim 37 wherein the ensuring that the circular list is accessible through the identified item includes leaving the identified item to point to the item that was the next item before the identified item was removed from the circular list.

42. The computer-readable medium of claim 37 wherein the ensuring that the circular list is accessible through the identified item includes setting the identified item to point to another item previously removed from the circular list so that the identified item points to an item of the circular list indirectly through the previously removed item.

43. The computer-readable medium of claim 37 wherein the items in the circular list and items removed from the circular list form a six list and including preventing multiple threads from simultaneously adjusting the number of items in the six list.

44. The computer-readable medium of claim 37 wherein when another item is removed from the circular list, the other item is set to point to the identified item so that when the other item is accessed after the other item has been removed from the circular list, an item still in the circular list can be located through the identified item.

45. The computer-readable medium of claim 37 wherein the circular list and items removed from the circular list form a six list.

46. The computer-readable medium of claim 45 wherein the items in the circular list form a circle portion of the six list and the items removed from the circular list form a tail portion of the six list.

47. The computer-readable medium of claim 37 including setting a tail pointer to point to the identified item.

48. The computer-readable medium of claim 37 including:
    identifying a second item to be removed from the circular list;
    setting the item before the second identified item to point to the item after the second identified item; and
    setting the second identified item to point to the identified item.

49. The computer-readable medium of claim 48 including:
    setting a tail pointer to point to the second identified item.

50. The computer-readable medium of claim 37 wherein the items of the circular list and the items that have been removed from a six list and wherein a removed item is added back to the circular list, by
    identifying a removed item;
    if the identified removed item does not already point to an item of the circular list, setting the identified removed item to point to an item of the circular list; and
    setting the item of the circular that is before the item to which the identified removed item points to point to the identified removed item.

51. The computer-readable medium of claim 50 including locking the six before a removed item is added back to the circular list.

52. A system in a computer system for removing an item from a circular list that is simultaneously accessible by multiple threads of execution, each item pointing to a next item in the circular list, including:
    means for identifying an item to be removed from the circular list;
    means for setting the item before the identified item to point to the item after the identified item; and
    means for ensuring that the circular list is accessible through the identified item.

53. The system of claim 52 wherein the circular list is doubly linked and each item includes a pointer to a previous item, and including means for setting the item after the identified item to point to the item before the identified item.

54. The system of claim 52 wherein the circular list is only traversed in the direction of the next item.

55. The system of claim 52 including means for setting an indication in the identified item so that when a thread accesses the identified item after the identified item has been removed from the circular list, the thread will proceed to the next item pointed to by the identified item.

56. The system of claim 52 wherein the means for ensuring that the circular list is accessible through the identified item leaves the identified item to point to the item that was the next item before the identified item was removed from the circular list.

57. The system of claim 52 wherein the means for ensuring that the circular list is accessible through the identified item sets the identified item to point to another item previously removed from the circular list so that the identified item points to an item of the circular list indirectly through the previously removed item.

58. The system of claim 52 wherein the items in the circular list and items removed from the circular list form a six list and including means for preventing multiple threads from simultaneously adjusting the number of items in the six list.

59. The system of claim 52 wherein when another item is removed from the circular list, means for setting the other item to point to the identified item so that when the other item is accessed after the other item has been removed from the circular list, an item still in the circular list can be located through the identified item.

60. The system of claim 52 wherein the circular list and items removed from the circular list form a six list.

61. The system of claim 60 wherein the items in the circular list form a circle portion of the six list and the items removed from the circular list form a tail portion of the six list.

62. The system of claim 52 including means for setting a tail pointer to point to the identified item.

63. The system of claim 52 including:
 means for identifying a second item to be removed from the circular list;
 means for setting the item before the second identified item to point to the item after the second identified item; and
 means for setting the second identified item to point to the identified item.

64. The system of claim 63 including means for setting a tail pointer to point to the second identified item.

65. The system of claim 52 wherein the items of the circular list and the items that have been removed form a six list and wherein a removed item is added back to the circular list, by
 identifying a removed item;
 if the identified removed item does not already point to an item of the circular list, setting the identified removed item to point to an item of the circular list; and
 setting the item of the circular that is before the item to which the identified removed item points to point to the identifed removed item.

66. The system of claim 65 including means for locking the six list before a removed item is added back to the circular list.

67. The system of claim 65 wherein the identified removed item is the only removed item that points to an item on the circular list.

68. The system of claim 52 wherein items of the circular list are accessible through a circle pointer and items that have been removed are accessible through a tail pointer.

\* \* \* \* \*

UNITED STATES PATENT AND TRADEMARK OFFICE
CERTIFICATE OF CORRECTION

PATENT NO.    : 6,353,829 B1
DATED         : March 5, 2002
INVENTOR(S)   : Koblenz et al.

It is certified that error appears in the above-identified patent and that said Letters Patent is hereby corrected as shown below:

Column 2,
Line 23, "scur:" should be -- scur; --;
Line 44, delete comma after first occurrence of "IPL";

Column 3,
Line 63, "load" should be -- loads --;

Column 4,
Line 65, "set." should be -- set, --;

Column 6,
Line 39, "I)during" should be -- During --;
Line 64, "TILE" should be -- THE --;

Column 9,
Line 64, "Aq" should be -- As --;

Column 12,
Line 46, add comma between "request" and "it";

Column 14,
Line 41, "in" should be -- In --;

Column 15,
Line 1, "bins" should be -- bin, --;

Column 16,
Line 8, add comma between "thread." and "it";
Line 23, "hit" should be -- bit --;

Column 17,
Line 55, "1617." should be -- 1617, --;

Column 18,
Line 21, "1713." should be -- 1713, --;

Column 19,
Line 43, insert -- 1 -- between "claim" and "wherein";

UNITED STATES PATENT AND TRADEMARK OFFICE
CERTIFICATE OF CORRECTION

PATENT NO. : 6,353,829 B1
DATED : March 5, 2002
INVENTOR(S) : Koblenz et al.

It is certified that error appears in the above-identified patent and that said Letters Patent is hereby corrected as shown below:

Column 20,
Line 51, insert comma after "lockers";

Column 22,
Line 18, "from" should be -- form --;
Line 29, add -- list -- between "six" and "before";

Column 24,
Line 13, "indentifed" should be -- identified --;

Signed and Sealed this

Twentieth Day of August, 2002

Attest:

JAMES E. ROGAN
Attesting Officer  Director of the United States Patent and Trademark Office